(12) United States Patent
Nishimura et al.

(10) Patent No.: US 10,969,004 B2
(45) Date of Patent: Apr. 6, 2021

(54) VEHICLE

(71) Applicants: SRI International, Menlo Park, CA (US); YAMAHA HATSUDOKI KABUSHIKI KAISHA, Shizuoka (JP)

(72) Inventors: Keiji Nishimura, Cypress, CA (US); Thomas Low, Belmont, CA (US)

(73) Assignees: SRI INTERNATIONAL, Menlo Park, CA (US); YAMAHA HATSUDOKI KABUSHIKI KAISHA, Iwata (JP)

( * ) Notice: Subject to any disclaimer, the term of this patent is extended or adjusted under 35 U.S.C. 154(b) by 176 days.

(21) Appl. No.: 16/239,656

(22) Filed: Jan. 4, 2019

(65) Prior Publication Data
US 2019/0211919 A1 Jul. 11, 2019

Related U.S. Application Data

(60) Provisional application No. 62/613,800, filed on Jan. 5, 2018.

(51) Int. Cl.
*F16H 59/44* (2006.01)
*F16H 61/02* (2006.01)
(Continued)

(52) U.S. Cl.
CPC ............. *F16H 59/44* (2013.01); *F16H 59/66* (2013.01); *F16H 59/68* (2013.01); *F16H 59/74* (2013.01); *F16H 61/0213* (2013.01); *F16H 63/02* (2013.01); *B60Y 2200/12* (2013.01); *F16H 2059/366* (2013.01); *F16H 2059/605* (2013.01);
(Continued)

(58) Field of Classification Search
CPC .......... F16H 59/44; F16H 59/66; F16H 59/68; F16H 59/74; F16H 2059/6815; F16H 61/0213; F16H 2061/0216
See application file for complete search history.

(56) References Cited

U.S. PATENT DOCUMENTS 9,310,808 B2 * 4/2016 Shankwitz ........... G05D 1/0891
2014/0142822 A1 5/2014 Li
(Continued)

FOREIGN PATENT DOCUMENTS

DE 102010005045 A1 7/2011
EP 1860351 A1 5/2007
(Continued)

OTHER PUBLICATIONS

Communication in European Patent Application No. 19150157.6, dated Feb. 3, 2020.
(Continued)

*Primary Examiner* — Edwin A Young
(74) *Attorney, Agent, or Firm* — McDonnell Boehnen Hulbert & Berghoff LLP

(57) ABSTRACT

A vehicle includes a main body, a transmission having a plurality of gear stages, a data storage, and an electronic controller. The data storage stores vehicle running condition data that includes at least one of a prescribed vehicle running condition, a sensed vehicle running condition, or a transmitted vehicle running condition. The electronic controller determines a gear shift of the gear stages of the transmission based on a future vehicle speed that has been estimated based on the vehicle running condition data.

20 Claims, 15 Drawing Sheets

(51) Int. Cl.
F16H 59/66 (2006.01)
F16H 59/68 (2006.01)
F16H 59/74 (2006.01)
F16H 63/02 (2006.01)
F16H 59/60 (2006.01)
F16H 59/36 (2006.01)

(52) U.S. Cl.
CPC .. *F16H 2059/663* (2013.01); *F16H 2059/666* (2013.01); *F16H 2061/0216* (2013.01); *F16H 2306/30* (2013.01)

(56) References Cited

U.S. PATENT DOCUMENTS

| | | | |
|---|---|---|---|
| 2015/0330503 A1* | 11/2015 | Sujan | F16H 61/02 701/55 |
| 2018/0023692 A1* | 1/2018 | Gauthier | F16H 59/44 701/55 |
| 2018/0051802 A1 | 2/2018 | Ishiguro et al. | |
| 2019/0136966 A1 | 5/2019 | Koide et al. | |
| 2019/0154143 A1* | 5/2019 | Ganske | F16H 59/68 |

FOREIGN PATENT DOCUMENTS

| | | |
|---|---|---|
| EP | 3480496 A1 | 5/2019 |
| JP | 2010-250442 A | 11/2010 |
| JP | 2016-183728 A | 10/2016 |
| WO | 2017070426 A1 | 4/2017 |

OTHER PUBLICATIONS

Extended European Search Report for European Application No. 19150157.6, dated May 21, 2019.

* cited by examiner

Gear Downshift Table

| | Third Prescribed Threshold | Fourth Prescribed Threshold |
|---|---|---|
| 2nd to 1st | 70 | 40 |
| 3rd to 2nd | 130 | 105 |
| ... | | |

FIG. 8

Gear Upshift Table

| | First Prescribed Threshold | Second Prescribed Threshold |
|---|---|---|
| 1st to 2nd | 50 | 80 |
| 2nd to 3rd | 115 | 140 |
| ... | | |

FIG. 7

VEHICLE

CROSS-REFERENCE TO RELATED APPLICATIONS

This application claims the benefit of U.S. Provisional Patent Application No. 62/613,800, filed Jan. 5, 2018, which is incorporated herein by reference.

BACKGROUND

Field of the Invention

The present invention generally relates to a vehicle. More specifically, the present invention relates to a vehicle with a transmission having a plurality of gear stages.

Background Information

In motor vehicles, a transmission is used to provide speed and torque conversions from a power source, such as an internal combustion engine, to a drive wheel. For example, the transmission reduces a higher engine speed to a lower wheel speed, which also increases torque in the process. Generally, a transmission has a plurality of gear stages to be switched therebetween as speed varies. This switching or gear shift can be done manually or automatically.

Specifically, in a manual transmission system, a driver performs a gear shift by operating a shift actuator using a clutch pedal or clutch lever and a shift pedal or shift switch. In an automatic transmission system, a shift actuator is automatically operated according to a vehicle speed, an engine rotational speed, and the like. There is also an automated manual transmission system in which a driver only operates a shift pedal or shift switch and a clutch operation is automatically performed.

SUMMARY

Generally, the gear shift of the transmission needs to be performed at a proper time. In particular, if the gear shift is performed manually at an improper time, then a driver needs to perform additional operations or pay additional attention for driving the vehicle due to a torque change caused by the gear shift (i.e., due to a torque difference between engine side torque and transmission side torque).

Also, even if the gear shift is automatically performed according to a current vehicle speed, a current engine rotational speed, and the like, an unnecessary gear shift sometimes occurs or a desired gear shift sometimes does not occur. For example, it has been discovered that an unnecessary gear upshift sometimes automatically occurs when the vehicle is driving under a condition in which a gear downshift will be needed in the immediate future. Also, it has been discovered that a desired gear downshift sometimes automatically does not occur when the vehicle is driving under a condition in which it will be necessary to use engine braking in the immediate future.

Generally, the present disclosure is directed to various features of a vehicle. One object is to provide a vehicle which improves gear shift timing of a transmission.

In accordance with one aspect of the present disclosure, a vehicle includes a main body, a transmission having a plurality of gear stages, a data storage, and an electronic controller. The data storage stores vehicle running condition data that includes at least one of a prescribed vehicle running condition, a sensed vehicle running condition, or a transmitted vehicle running condition. The electronic controller determines a gear shift of the gear stages of the transmission based on a future vehicle speed that has been estimated based on the vehicle running condition data.

Also, other features, aspects and advantages of the disclosed vehicle will become apparent to those skilled in the field of vehicles from the following detailed description, which, taken in conjunction with the drawings, discloses several illustrative embodiments of a vehicle with various features.

BRIEF DESCRIPTION OF THE DRAWINGS

Referring now to the drawings which form a part of this original disclosure:

FIG. 7 illustrates a gear upshift table storing first and second prescribed thresholds for a gear upshift judgement used in the gear shift judgement process illustrated in FIG. 6;

FIG. 8 illustrates a gear downshift table storing third and fourth prescribed thresholds for a gear downshift judgement used in the gear shift judgement process illustrated in FIG. 6;

Figure 1:
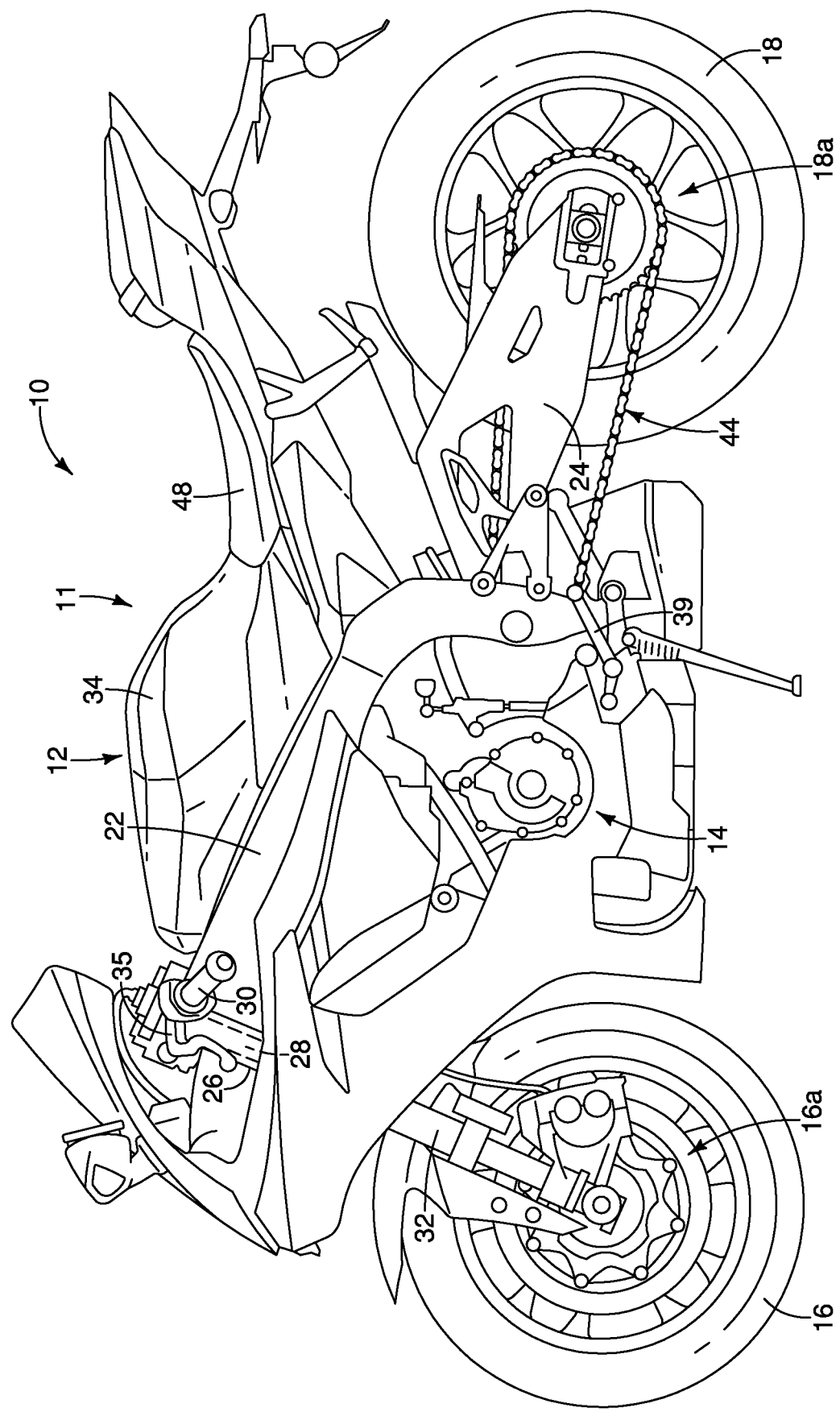
FIG. 1 is a left side elevational view of a wheeled vehicle body of a vehicle in accordance with one embodiment.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a vehicle 10 is illustrated that is configured to be operated by a gear shift control in accordance with one embodiment. In the illustrated embodiment, the gear shift control of the vehicle 10 is performed using a future running condition of the vehicle 10.

As shown in FIG. 1, the vehicle 10 has a wheeled vehicle body 11 that is illustrated as a two-wheeled motorcycle or sport bike. However, the wheeled vehicle body 11 can be any other street or on-road type motorcycle. Also, the wheeled vehicle body 11 is not limited to on-road type motorcycles, and can be of, for example, a so-called scooter type, a moped type, an off-road type, and the like. Also, the wheeled vehicle body 11 is not limited to motorcycles, and can be any other straddle type vehicles, in which a driver (rider) rides astride, such as an ATV (All Terrain Vehicle), a four-wheel buggy and the like, or any other type of motor vehicles.

In the following description, the terms "front" and "forward" refer to a direction in which a driver looks straight ahead when seated on the seat. Also in the following description, the terms "rear," "rearward" and "backward" refer to a direction opposite to the front or forward direction. Also, the term "left" refer to a direction towards the left side of a driver while the driver looks straight ahead when seated on the seat. Furthermore, the term "right" refers to a direction opposite to the left direction.

Figure 2:
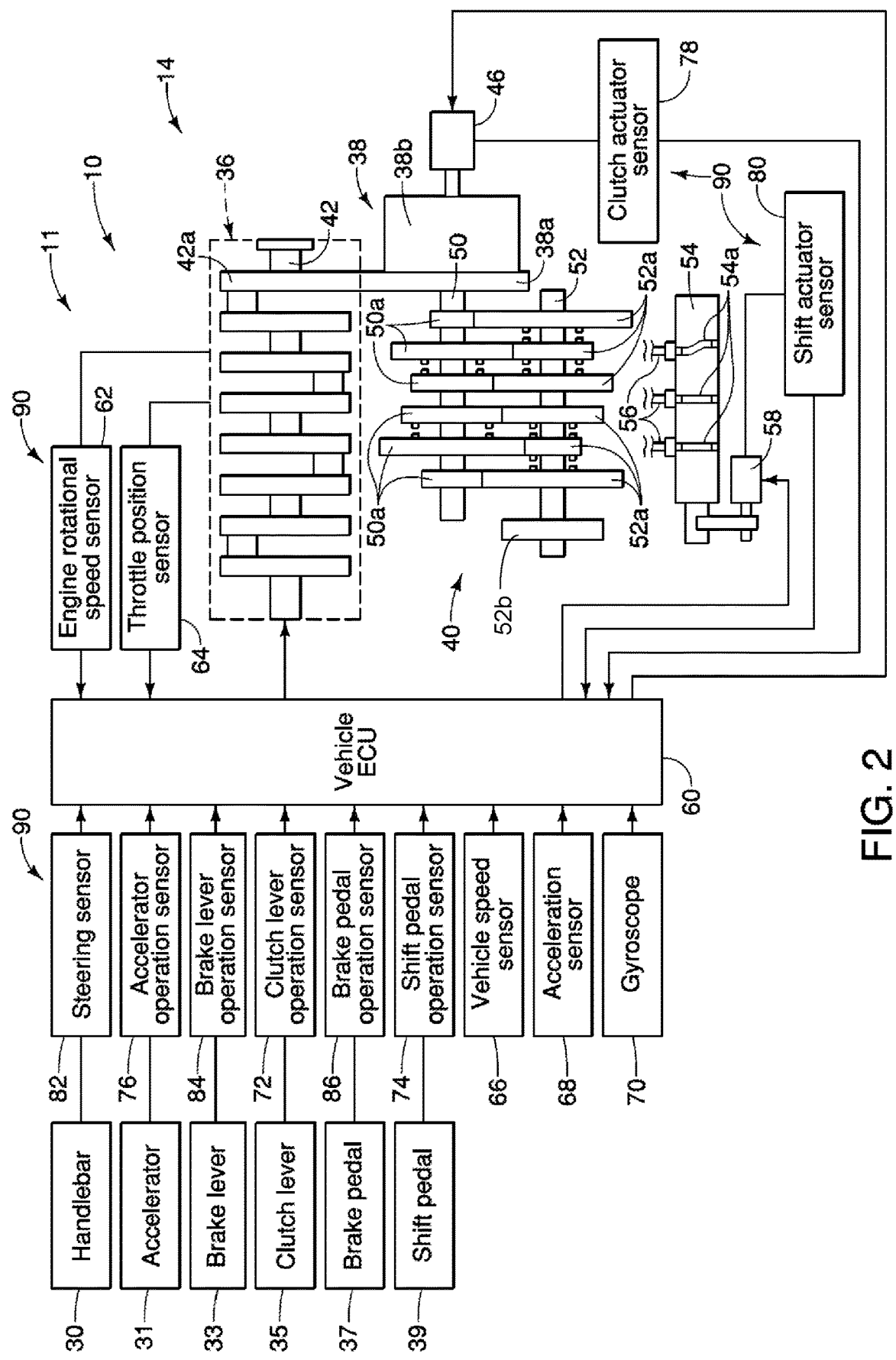
FIG. 2 illustrates a schematic diagram illustrating a drive unit of the wheeled vehicle body illustrated in FIG. 1, and a block diagram of an electronic configuration of the wheeled vehicle body illustrated in FIG. 1.

As illustrated in FIG. 1, the wheeled vehicle body 11 includes a main body 12, a drive unit 14, a front wheel 16 and a rear wheel 18. The main body 12 has a body frame 22 and a swing arm 24. The body frame 22 forms a framework of the wheeled vehicle body 11, and carries the drive unit 14 in a conventional manner. The body frame 22 also has a head tube 26 at a front end thereof. The head tube 26 rotatably supports a steering shaft 28. The wheeled vehicle body 11 also includes a handlebar 30 coupled to an upper end of the steering shaft 28 and a front fork 32 coupled to a lower end of the steering shaft 28. The handlebar 30 has a right handlebar throttle grip or accelerator 31 (FIG. 2), a brake lever 33 (FIG. 2) and a clutch lever 35. The accelerator 31 is rotatable to control the throttle of an internal combustion engine 36 (FIG. 2). The brake lever 33 is pivotally coupled to a right-side portion of the handlebar 30 near the accelerator 31 to actuate a front brake 16a and to apply braking power to the front wheel 16. The clutch lever 35 is pivotally coupled to a left-side portion of the handlebar 30 to adjust an engagement capacity of a clutch 38 (FIG. 2). The front fork 32 rotatably supports the front wheel 16. The swing arm 24 is pivotally coupled to the body frame 22 at a rear end thereof. The swing arm 24 rotatably supports the rear wheel 18 at a rear end portion thereof. In the illustrated embodiment, the front wheel 16 is a steerable wheel of the vehicle 10 (e.g., a single steerable front wheel), while the rear wheel 18 is a drive wheel of the vehicle 10 that is driven by the drive unit 14. The wheeled vehicle body 11 also includes a fuel tank 34 and a seat 48. The fuel tank 34 is located on the body frame 22. The seat 48 is also located on the body frame 22 rearward of the fuel tank 34. The seat 48 is a straddle seat on which a driver can ride astride. The wheeled vehicle body 11 further includes a brake pedal 37 (FIG. 2) and a shift pedal 39. The brake pedal 37 is pivotally coupled to the main body 12 on a lower right portion of the main body 12. The brake pedal 37 actuates a rear brake 18a to apply braking power to the rear wheel 18. The shift pedal 39 is pivotally coupled to the main body 12 on a lower left portion of the main body 12. The shift pedal 39 operates a transmission mechanism 40 (FIG. 2) to shift the gear stages of the transmission mechanism 40. The wheeled vehicle body 11 further includes many other conventional vehicle components that are typically provided on motorcycles or motor vehicles. However, for the sake of brevity, only those vehicle components needed to understand the present invention will be illustrated and/or discussed herein.

As illustrated in FIG. 2, the drive unit 14 includes the engine 36, the clutch 38 and the transmission mechanism 40 (e.g., a transmission) with a plurality of (six in the illustrated embodiment) gear stages. In the illustrated embodiment, the engine 36, the clutch 38 and the transmission mechanism 40 are integrally assembled within a crankcase. The transmission mechanism 40 is coupled to an engine crankshaft 42 via the clutch 38 to receive drive power of the engine 36 and to transfer the drive power to the rear wheel 18 via a drive chain 44 (FIG. 1). Specifically, the crankshaft 42 of the engine 36 has a crankshaft gear 42a. The crankshaft gear 42a meshes with a driven gear 38a that is integrally provided with a clutch housing 38b of the clutch 38. In the illustrated embodiment, the clutch 38 includes a multi-plate friction clutch that transfers the drive power from the engine 36 to the transmission mechanism 40 while the clutch 38 is in an engaged state, and that prevents the drive power from being transferred to the transmission mechanism 40 while the clutch 38 is in a disengaged state. The wheeled vehicle body 11 further includes a clutch actuator 46 that operates the clutch 38 to switch between the engaged state and the disengaged state. In the illustrated embodiment, the clutch actuator 46 includes a servo motor. However, the clutch actuator 46 can be any other type of clutch actuators, such as a hydraulic actuator, conventionally used for motorcycles or motor vehicles, as needed and/or desired.

The transmission mechanism 40 includes an input shaft 50 with a plurality of input shaft gears 50a, and an output shaft 52 with a plurality of output shaft gears 52a and a drive sprocket 52b. The output shaft gears 52a selectively mesh with the input shaft gears 50a, respectively. Specifically, in the illustrated embodiment, the transmission mechanism 40 includes a constant mesh type transmission in which each of gear pairs of the input shaft gears 50a and the output shaft gears 52a is always meshed. These gear pairs defines the plurality of gear stages that provide different gear ratios, respectively, and only one of the gear pairs is selectively placed into a locking position in which the one of the gear pairs can transmit the rotation of the input shaft 50 to the output shaft 52. Specifically, the transmission mechanism 40 further includes a shift drum 54 with a plurality of (three in the illustrated embodiment) grooves 54a and a plurality of (three in the illustrate embodiment) shift forks 56. The ends of the shift forks 56 ride within the grooves 54a, respectively, such that as the shift drum 54 turns, the grooves 54a shift a particular shift fork 56 in a direction parallel to the input shaft 50 and the output shaft 52. This also slides a particular input shaft gear 50a along the input shaft 50 or a particular output shaft gear 52a along the output shaft 52 that is coupled to the particular shift fork 56 to place one of the gear pairs into the locking position. When one of the gear pairs is placed into the locking position, then the rotation of the input shaft 50 is transmitted to the output shaft 52 with a gear ratio corresponding to the one of the gear pairs. The drive sprocket 52b is fixedly coupled to one end of the output shaft 52, and transmits the rotation of the output shaft 52 to the rear wheel 18 via the drive chain 44.

In the illustrated embodiment, the wheeled vehicle body 11 further includes a shift actuator 58 that operates the shift drum 54 to turn by a predetermined angle to shift the gear stages of the transmission mechanism 40. In the illustrated embodiment, the shift actuator 58 includes a servo motor. However, the shift actuator 58 can be any other type of shift actuators, such as a hydraulic actuator, conventionally used for motorcycles or motor vehicles, as needed and/or desired.

In the illustrated embodiment, the drive unit 14 can further include many other conventional components that are typically provided to a drive unit of motorcycles or motor vehicles. Also, the drive unit 14 can be any other type of drive units conventionally used for motorcycles or motor vehicles, as needed and/or desired.

Referring further to FIG. 2, the wheeled vehicle body 11 includes a vehicle ECU (Electronic Control Unit) 60 as an electronic controller for controlling various components of the wheeled vehicle body 11. Specifically, as understood in the art, the vehicle ECU 60 includes a microcomputer having one or more processors that execute one or more control programs for controlling the wheeled vehicle body 11. The vehicle ECU 60 can also include other conventional components such as an input interface circuit, an output interface circuit, and data/program storage devices such as a ROM (Read Only Memory) device and a RAM (Random Access Memory) device. The RAM and ROM store processing results and control programs that are run by the processor(s) of the vehicle ECU 60. The vehicle ECU 60 is operatively coupled to the components of the wheeled vehicle body 11 as appropriate, in a conventional manner. It will be apparent to those skilled in the art from this disclosure that the precise structure and algorithms for the vehicle ECU 60 can be any combination of hardware and software that will carry out the functions of the present invention.

As illustrated in FIG. 2, the vehicle ECU 60 is electrically coupled to various sensors that detect various parameters of the vehicle 10. In particular, the sensors include sensors that detect various parameters of the engine 36. For example, those sensors include an engine rotational speed sensor 62 and a throttle position sensor 64. The engine rotational speed sensor 62 is arranged to detect a rotational speed of the crankshaft 42 in a conventional manner. The engine rotational speed sensor 62 outputs signal indicative of an engine rotational speed to the vehicle ECU 60. The throttle position sensor 64 is arranged to detect a throttle opening angle of the throttle in a conventional manner. The throttle position sensor 64 outputs signal indicative of a throttle opening angle to the vehicle ECU 60. The sensors can also include any other type of sensors conventionally used for motorcycles or motor vehicles, such as a temperature sensor for detecting the temperature of the engine 36, a pressure sensor for detecting an intake pressure, an 02 sensor for detecting oxygen contained in the exhaust gas, and the like.

Furthermore, the vehicle ECU 60 is electrically coupled to various sensors that detect various operational parameters of the vehicle 10. For example, those sensors include a vehicle speed sensor 66, an acceleration sensor 68, a gyroscope 70, a clutch lever operation sensor 72, a shift pedal operation sensor 74, an accelerator operation sensor 76, a clutch actuator sensor 78, a shift actuator sensor 80, a steering sensor 82, a brake lever operation sensor 84, a brake pedal operation sensor 86, and the like. The vehicle speed sensor 66 is arranged to detect a current vehicle speed of the vehicle 10 in a conventional manner. For example, the vehicle speed sensor 66 detects a rotational speed of the rear wheel 18, and outputs a signal indicative of a current vehicle speed of the vehicle 10. The acceleration sensor 68 is arranged to detect acceleration of the vehicle 10 in the forward-backward, up-down and right-left directions, and outputs a signal indicative of the acceleration of the vehicle 10 to the vehicle ECU 60 in a conventional manner. The gyroscope 70 is arranged to detect angular velocity in the pitch, roll and yaw directions, and outputs a signal indicative of the angular velocity to the vehicle ECU 60 in a conventional manner. In the illustrated embodiment, the acceleration sensor 68 and the gyroscope 70 can be packaged as a unit, such as an IMU (Inertial Measurement Unit). In this case, the IMU can further calculate a vehicle lean angle (bank angle) and/or a rear wheel slide, and output a signal indicative of the vehicle lean angle and/or the rear wheel slide to the vehicle ECU 60. The clutch lever operation sensor 72 is arranged to detect lever operation amount of the clutch lever 35, and outputs a signal indicative of the lever operation amount to the vehicle ECU 60 in a conventional manner. The shift pedal operation sensor 74 is arranged to detect shift operation (upshift or downshift) of the shift pedal 39, and outputs a signal indicative of the shift operation to the vehicle ECU 60 in a conventional manner. The accelerator operation sensor 76 is arranged to detect operation amount of the accelerator 31, and outputs a signal indicative of the operation amount of the accelerator 31 to the vehicle ECU 60 in a conventional manner. The clutch actuator sensor 78 is arranged to detect a drive amount (clutch position) of the clutch actuator 46, and outputs a signal indicative of the drive amount of the clutch actuator 46 to the vehicle ECU 60 in a conventional manner. The shift actuator sensor 80 is arranged to detect a drive amount or a current shift position (a current gear stage) of the shift actuator 58, and outputs a signal indicative of the drive amount or the current shift position (the current gear stage) of the shift actuator 58 to the vehicle ECU 60 in a conventional manner. The steering sensor 82 is arranged to detect a steering angle of the handlebar 30, and outputs a signal indicative of the steering angle of the handlebar 30 to the vehicle ECU 60. The brake lever operation sensor 84 is arranged to detect lever operation amount of the brake lever 33, and outputs a signal indicative of the lever operation amount to the vehicle ECU 60 in a conventional manner. The brake pedal operation sensor 86 is arranged to detect a pedal operation amount of the brake pedal 37, and outputs a signal indicative of the pedal operation amount to the vehicle ECU 60 in a conventional manner. The sensors can also include any other type of sensors conventionally used for motorcycles or motor vehicles, as needed and/or desired. In the illustrated embodiment, the sensors that are electrically coupled to the vehicle ECU 60 in FIG. 2 are hereinafter referred to as "vehicle body sensors 90" of the wheeled vehicle body 11. The vehicle body sensors 90 do not need to include all of the above-mentioned sensors, and may only include part of the above-mentioned sensors as needed and/or desired for the gear shift control of the vehicle 10.

As illustrated in FIG. 2, the wheeled vehicle body 11 has a ride-by-wire or throttle-by-wire system. For example, the vehicle ECU 60 operates the throttle of the engine 36 to accelerate or decelerate the wheeled vehicle body 11 according to the signal indicative of the operation amount of the accelerator 31 from the accelerator operation sensor 76 in response to the operation of the accelerator 31. Also, the vehicle ECU 60 operates the clutch actuator 46 to operate the clutch 38 according to the signal indicative of the lever operation amount of the clutch lever 35 from the clutch lever operation sensor 72 in response to the operation of the clutch lever 35. Furthermore, the vehicle ECU 60 operates the shift actuator 58 to shift the gear stages of the transmission mechanism 40 according to the signal indicative of the shift operation of the shift pedal 39 from the shift pedal operation sensor 74 in response to the operation of the shift pedal 39.

In the illustrated embodiment, the wheeled vehicle body 11 can be configured to switch operation mode between a "manual transmission mode", an "automatic transmission mode" and "automated transmission mode". In the manual transmission mode, the clutch actuator 46 and the shift actuator 58 are driven in response to physical operations of the clutch lever 35 and the shift pedal 39. In the automatic transmission mode, the clutch actuator 46 and the shift actuator 58 are driven based on operation signals from the vehicle ECU 60 without physical operations of the clutch lever 35 and the shift pedal 39. In the automated transmission mode, the shift actuator 58 is driven in response to physical operation of the shift pedal 39, and the clutch actuator 46 is driven based on operation signal from the vehicle ECU 60 without physical operation of the clutch lever 35. However, the configuration of the wheeled vehicle body 11 is not limited to this. The wheeled vehicle body 11 can be configured to mechanically operate the clutch 38 in response to physical operation of the clutch lever 35 in a conventional manner. Also, the wheeled vehicle body 11 can be configured to mechanically operate the shift drum 54 in response to physical operation of the shift pedal 39.

Figure 3:
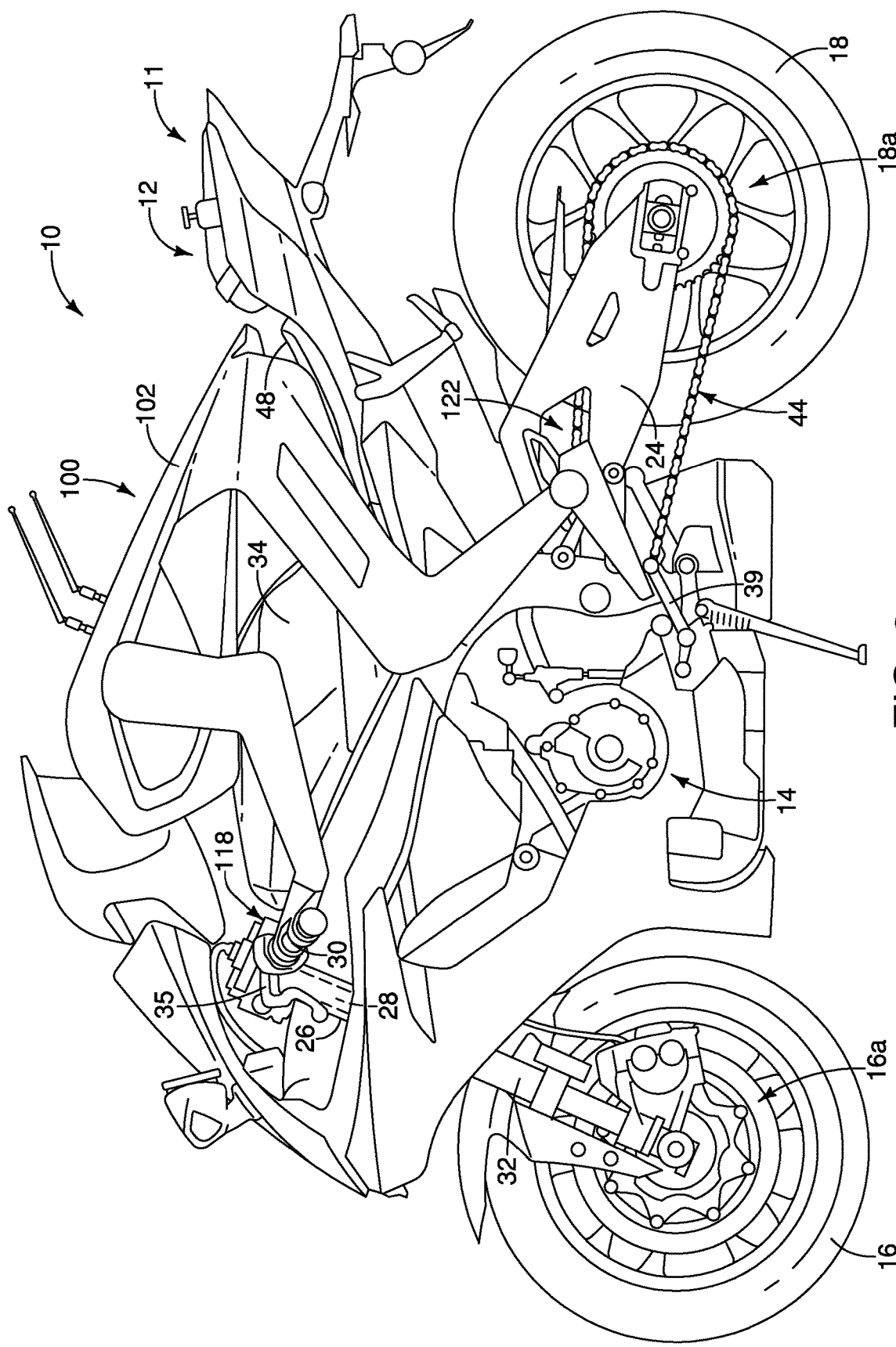
FIG. 3 is a left side elevational view of an external vehicle actuator attached to the wheeled vehicle body.

Referring now to FIG. 3, the vehicle 10 further includes an external vehicle actuator 100. As illustrated in FIG. 3, the external vehicle actuator 100 is formed as a humanoid or human-mimicking robot that resembles a human driver (rider). The external vehicle actuator 100 is externally attached to the wheeled vehicle body 11 with little or no modification to the wheeled vehicle body 11. The external vehicle actuator 100 physically operates various components of the wheeled vehicle body 11, such as the handlebar 30, the accelerator 31, the brake lever 33, the clutch lever 35, the brake pedal 37, and the shift pedal 39 of the wheeled vehicle body 11, to autonomously drive the vehicle 10. With this configuration, the vehicle 10 can be utilized by switching an operation mode between an autonomous driven mode and a manual driven mode. In the autonomous driven mode, the external vehicle actuator 100 is attached to the wheeled vehicle body 11 and autonomously drives the vehicle 10. In the manual driven mode, the external vehicle actuator 100 is detached from the wheeled vehicle body 11, and a human driver manually drives the vehicle 10.

Figure 4:
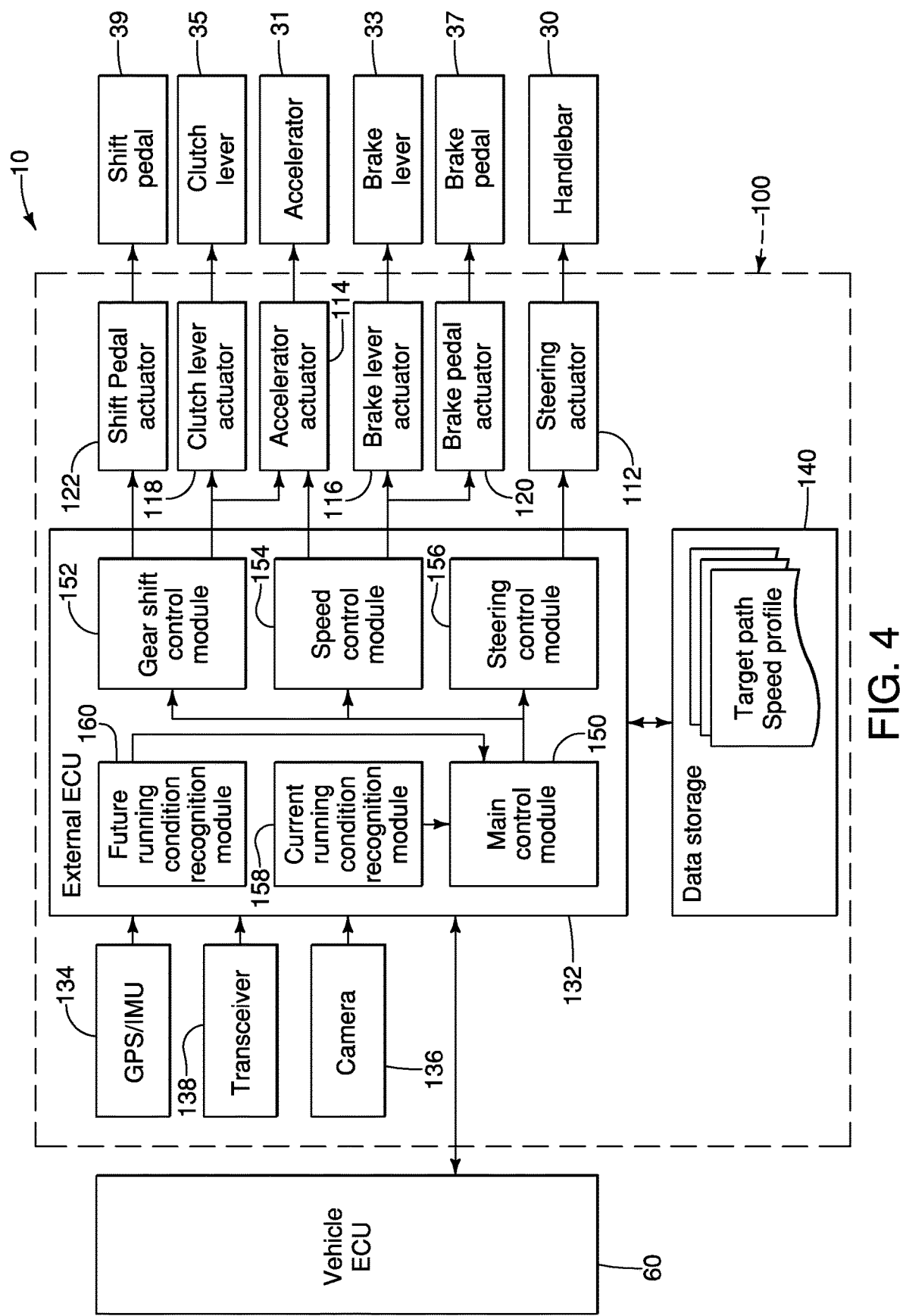
FIG. 4 illustrates a block diagram of an electronic configuration of the external vehicle actuator illustrated in FIG. 3.

Specifically, as illustrated in FIGS. 3 and 4, the external vehicle actuator 100 includes a steering actuator 112, an accelerator actuator 114, a brake lever actuator 116, a clutch lever actuator 118, a brake pedal actuator 120 and a shift pedal actuator 122. In the illustrated embodiment, these actuators are arranged on a single main body 102 of the external vehicle actuator 100. These actuators are further configured and arranged to operate the handlebar 30, the accelerator 31, the brake lever 33, the clutch lever 35, the brake pedal 37, the shift pedal 39 of the wheeled vehicle body 11 in a conventional manner as understood in the motorcycle or motor vehicle field.

In particular, the steering actuator 112 includes a servo motor, and is arranged to steer the handlebar 30. Specifically, the steering actuator 112 is disposed inside the main body 102. The steering actuator 112 is mechanically linked to the handlebar 30 through right and left arm portions of the main body 102 to steer the handlebar 30 in a conventional manner. The accelerator actuator 114 includes a servo motor, and is arranged to turn the accelerator 31 relative to the handlebar 30. Specifically, the accelerator actuator 114 is disposed at a right hand portion of the main body 102, and is mechanically linked to the accelerator 31 to turn the accelerator 31 in a conventional manner. The brake lever actuator 116 includes a servo motor, and is arranged to grip or operate the brake lever 33. Specifically, the brake lever actuator 116 is disposed at the right hand portion of the main body 102, and is mechanically linked to the brake lever 33 to operate the brake lever 33 in a conventional manner. The clutch lever actuator 118 includes a servo motor, and is arranged to grip or operate the clutch lever 35. Specifically, the clutch lever actuator 118 is disposed at a left hand portion of the main body 102, and is mechanically linked to the clutch lever 35 to operate the clutch lever 35 in a conventional manner. The brake pedal actuator 120 includes a servo motor, and is arranged to operate the brake pedal 37. Specifically, the brake pedal actuator 120 is disposed at a right foot portion of the main body 102, and is mechanically linked to the brake pedal 37 to operate the brake pedal 37 in a conventional manner. The shift pedal actuator 122 includes a servo motor, and is arranged to operate the shift pedal 39. Specifically, the shift pedal actuator 122 is disposed at a left foot portion of the main body 102, and is mechanically linked to the shift pedal 39 to operate the shift pedal 39 in a conventional manner. In the illustrated embodiment, these actuators are arranged on a single main body 102 of the external vehicle actuator 100. However, these actuators can be independently attached to the main body 12 of the vehicle 10 without having a single main body. Furthermore, the arrangements and the configurations of these actuators are not limited to this. The arrangements and the configurations of these actuators can be adopted according to the arrangements and the configurations of the various parts of the wheeled vehicle body 11 to which these actuators are linked.

As illustrated in FIG. 4, the external vehicle actuator 100 includes an external ECU (Electronic Control Unit) 132 as an electronic controller for controlling various components of the external vehicle actuator 100. Specifically, as understood in the art, the external ECU 132 includes a microcomputer having one or more processors that execute one or more control programs for controlling the external vehicle actuator 100. The external ECU 132 can also include other conventional components such as an input interface circuit, an output interface circuit, and data/program storage devices such as a ROM (Read Only Memory) device and a RAM (Random Access Memory) device. The RAM and ROM store processing results and control programs that are run by the processor(s) of the external ECU 132. The external ECU 132 is operatively coupled to the components of the external vehicle actuator 100 as appropriate, in a conventional manner. It will be apparent to those skilled in the art from this disclosure that the precise structure and algorithms for the external ECU 132 can be any combination of hardware and software that will carry out the functions of the present invention.

As illustrated in FIG. 4, the external ECU 132 is electrically coupled to various sensors that detect various parameters of the external vehicle actuator 100. For example, those sensors include a GPS/IMU 134 and a camera 136. The GPS/IMU 134 is arranged on the main body 102 of the external vehicle actuator 100. The GPS/IMU 134 detects a current vehicle location of the vehicle 10. The GPS/IMU 134 receives satellite signals from satellites, corrects the GPS data using IMU data, and outputs the current vehicle location of vehicle 10. The GPS/IMU 134 also can output acceleration and/or angular velocity of the external vehicle actuator 100 (i.e., the acceleration and/or the angular velocity of the vehicle 10). The GPS/IMU 134 can include different types of sensors to detect the current vehicle location. For example, the current vehicle location can be derived from satellite-based positioning systems (global navigation satellite systems, GNSS) other than GPS, such as, GLONASS, Galileo and BeiDou, for example.

The camera 136 is arranged on the main body 102 of the external vehicle actuator 100. The camera 136 optically detects traveling environment about the vehicle 10. The traveling environment about the vehicle 10 can be detected by any other type of sensors, such as a LIDAR (Light Detection and Ranging), a RADAR (Radio Detecting and Ranging), and the like. In the illustrated embodiment, the camera 136 captures image of the traveling environment about the vehicle 10. The external ECU 132 processes the image of the traveling environment to detect road information and traffic information, for example, in a conventional manner. The road information includes information about road slope/camber/bank, bumps, manholes, road surface condition, and the like. Traffic information includes information about traffic signals, traffic signs (e.g., speed limit signs, stop signs, etc.), pedestrians around the vehicle 10, vehicles around the vehicle 10, and the like.

As illustrated in FIG. 4, the external ECU 132 is also electrically coupled to a transceiver 138. The transceiver 138 wirelessly communicates with a ground station to receive operational commands. The transceiver 138 can also be configured to communicate with an external server to access a cloud server or databases.

As illustrated in FIG. 4, the external ECU 132 is also electrically coupled to the vehicle ECU 60 of the wheeled vehicle body 11. The external ECU 132 is interconnected to the vehicle ECU 60 through a vehicle bus, such as a CAN (Controller Area Network). With this configuration, the external ECU 132 obtains a current vehicle running condition detected by the vehicle body sensors 90 (FIG. 2) from the vehicle ECU 60.

Also, as illustrated in FIG. 4, the external vehicle actuator 100 includes a data storage 140. The data storage 140 stores data obtained by the external ECU 132. In particular, the data storage 140 stores data obtained from the vehicle ECU 60, the GPS/IMU 134, the camera 136, the transceiver 138, and the like. The data storage 140 can store any other type of predetermined data, such as map data, that is stored in advance. In the illustrated embodiment, the data storage 140 is disposed inside the main body 102 of the external vehicle actuator 100. However, the location of the data storage 140 is not limited to this. The data storage 140 can be disposed on the main body 12 of the wheeled vehicle body 11.

In the illustrated embodiment, the external ECU 132 performs the gear shift control of the vehicle 10. The gear shift control of the vehicle 10 is performed during an autonomous control of the vehicle 10, such as a path following control, for example.

In the path following control, the vehicle 10 autonomously travels in a closed course or an open course along a predetermined target path using a predetermined target speed profile, for example. The predetermined target path and the predetermined target speed profile are preset and stored in advance in the data storage 140, for example. The predetermined target path includes a series of target vehicle location data. The target vehicle location data indicates a target vehicle location of the vehicle 10. The predetermined target speed profile includes a series of vehicle speed data. The vehicle speed data indicates target vehicle speed in association with a vehicle location along the predetermined target path. The predetermined target path and the predetermined target speed profile can be calculated by the external ECU 132 using 2D or 3D map data stored in the data storage 140 in a conventional manner used in a conventional navigation system.

As illustrated in FIG. 4, the external ECU 132 includes a main control module 150, a gear shift control module 152, a speed control module 154, a steering control module 156, a current running condition recognition module 158 and a future running condition recognition module 160. The main control module 150 performs a path following control of the vehicle 10. Specifically, the main control module 150 controls the vehicle 10 such that the vehicle 10 autonomously travels along the predetermined target path using the predetermined target speed profile. Specifically, the main control module 150 controls the gear shift control module 152, the speed control module 154 and the steering control module 156 based on current running condition data obtained from the current running condition recognition module 158 and future running condition data obtained from the future running condition recognition module 160.

In the path following control of the vehicle 10, the main control module 150 also performs the gear shift control, the speed control and the steering control of the vehicle 10 through the gear shift control module 152, the speed control module 154 and the steering control module 156, respectively.

In the gear shift control, the main control module 150 outputs to the gear shift control module 152 a shift operation signal that indicates the shift operation (upshift or downshift). In response, the gear shift control module 152 outputs a control signal to the shift pedal actuator 122 to physically operate the shift pedal 39 of the wheeled vehicle body 11 for performing the shift operation (upshift or downshift). Also, the gear shift control module 152 outputs a clutch operation signal to the clutch lever actuator 118 and accelerator operation signal to the accelerator actuator 114 to physically operate the clutch lever 35 and the accelerator 31 of the wheeled vehicle body 11 for performing the shift operation (upshift or downshift).

In the illustrated embodiment, the external vehicle actuator 100 performs the gear shift control by physically operating the shift pedal 39, the clutch lever 35 and the accelerator 31 of the wheeled vehicle body 11 using the shift pedal actuator 122, the clutch lever actuator 118 and the accelerator actuator 114. In other words, in the illustrated embodiment, the external vehicle actuator 100 can perform the gear shift control in accordance with this embodiment under the "manual transmission mode". On the other hand, the external vehicle actuator 100 can further perform the gear shift control in accordance with this embodiment in the "automatic transmission mode" or in the "automated transmission mode". Specifically, the external ECU 132 can be configured to output the shift operation signal, the clutch operation signal and the accelerator operation signal directly or indirectly (via the vehicle ECU 60) to the shift actuator 58, the clutch actuator 46 and the engine 36, respectively, to perform the shift operation (upshift or downshift) in the automatic transmission mode. Also, the external ECU 132 can be configured to output the control signal to the shift pedal actuator 122 to physically operate the shift pedal 39, and to output the clutch operation signal and the accelerator operation signal directly or indirectly (via the vehicle ECU 60) to the clutch actuator 46 and the engine 36, respectively, to perform the shift operation (upshift or downshift) in the automated transmission mode. Furthermore, the external ECU 132 can only be configured to output the control signal to the shift pedal actuator 122 to physically operate the shift pedal 39. In this case, the vehicle ECU 60 can further be configured to automatically operate the clutch actuator 46 and the engine 36 according to the shift operation at the shift pedal 39 in response to the vehicle ECU 60 detecting the shift operation at the shift pedal 39.

In the speed control, the main control module 150 outputs to the speed control module 154 a target speed signal that indicates a current target speed of the vehicle 10. In response, the speed control module 154 outputs control signals to the accelerator actuator 114, the brake lever actuator 116 and the brake pedal actuator 120 to physically operate the accelerator 31, the brake lever 33 and brake pedal 37, respectively, for achieving the current target speed (i.e., for accelerating or decelerating the vehicle 10 to achieve the current target speed). Also, in the steering control, the main control module 150 outputs to the steering control module 156 a target steering signal that indicates a current target steering torque applied to the handlebar 30 of the vehicle 10. The steering control module 156 outputs a control signal to the steering actuator 112 to physically operate the handlebar 30 of the vehicle 10 for achieving the current target steering torque.

Figure 5:
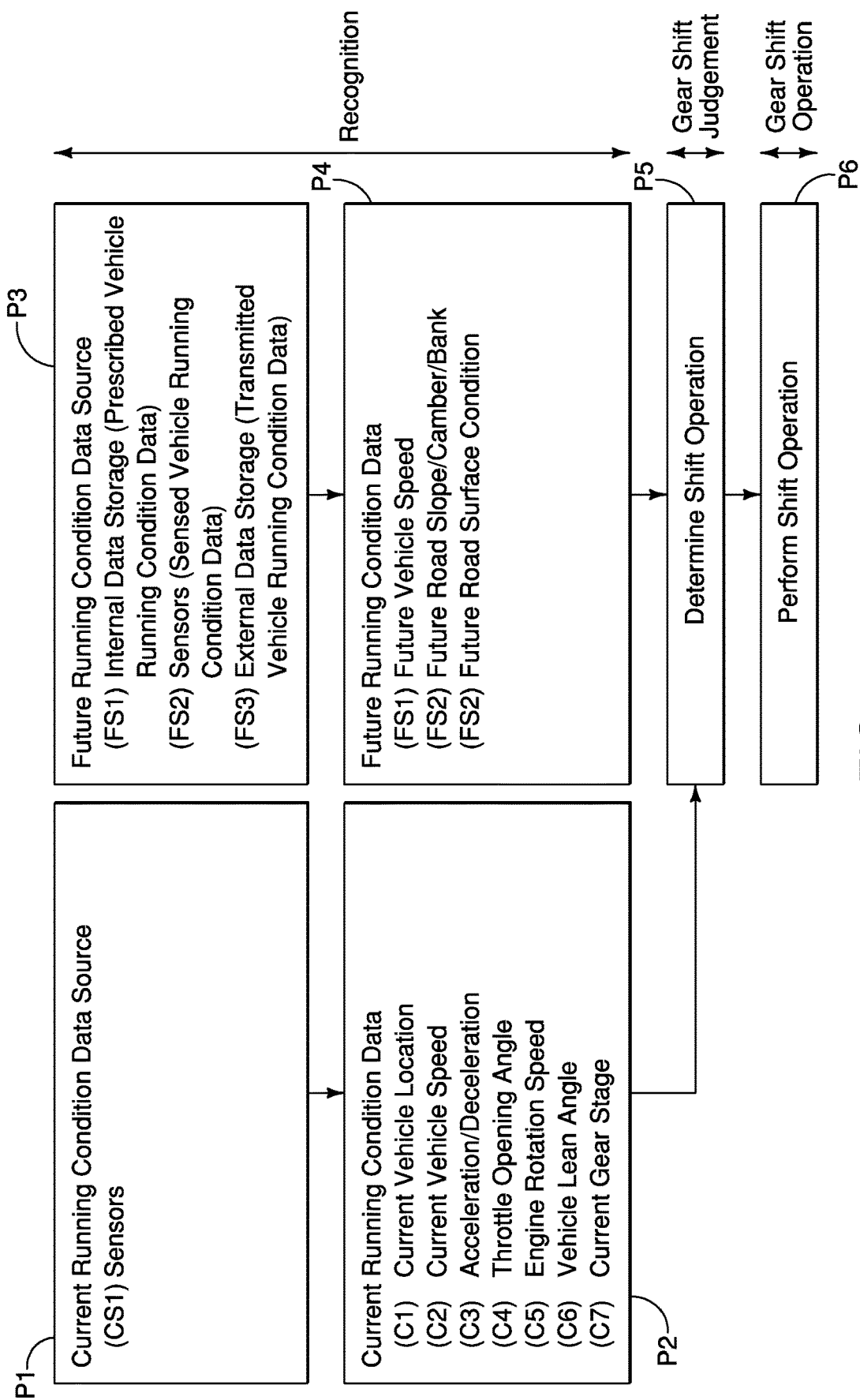
FIG. 5 is a schematic flow chart illustrating a gear shift control performed by the external vehicle actuator illustrated in FIG. 3.

Referring now to FIG. 5, the gear shift control of the vehicle 10 will be further discussed in detail. FIG. 5 illustrates a data flow of the gear shift control of the vehicle 10. As illustrated in FIG. 5, in the gear shift control, the external ECU 132 recognizes a running condition of the vehicle 10 (recognition processes P1-P4), determines a shift operation (upshift or downshift) (gear shift judgement process P5), and performs the shift operation of the vehicle 10 (gear shift operation process P6).

Specifically, as illustrated in FIG. 5, the current running condition recognition module 158 of the external ECU 132 obtains the current running condition data (recognition process P2) provided from a current running condition data source (recognition process P1).

In the illustrated embodiment, the current running condition data source can include the following, for example:

(CS1) Sensors.

Specifically, in the illustrated embodiment, the sensors of the current running condition data source (CS1) include the vehicle body sensors 90 (FIG. 2) and the GPS/IMU 134, for example. In the illustrated embodiment, the current running condition data provided from the current running condition data source (CS1) is stored in the data storage 140.

The current running condition recognition module 158 of the external ECU 132 obtains the current running condition data from the data storage 140 (recognition process P2). As illustrated in FIG. 5, the current running condition data obtained by the current running condition recognition module 158 can include one or more of the following, for example:

(C1) Current Vehicle Location
(C2) Current Vehicle Speed;
(C3) Acceleration/Deceleration;
(C4) Throttle Opening Angle;
(C5) Engine Rotational Speed;
(C6) Vehicle Lean Angle; and
(C7) Current Gear Stage.

The current running condition data (C1)-(C7) are obtained using the vehicle body sensors 90, for example. However, the current running condition recognition module 158 does not need to obtain all of the current running condition data (C1)-(C7) above. The current running condition recognition module 158 can obtain one or more of the current running condition data (C1)-(C7) above, as needed and/or desired for the gear shift control. Also, the current running condition recognition module 158 can obtain any other current running condition data as needed and/or desired. Also, in the illustrated embodiment, the current running condition data (C1)-(C7) does not need to be obtained using the vehicle body sensors 90, and can be obtained by sensors provided to the main body 102 of the external vehicle actuator 100. Specifically, in the illustrated embodiment, the current vehicle location, the current vehicle speed, the acceleration/deceleration and/or the vehicle lean angle can also be obtained using the GPS/IMU 134. Thus, the current vehicle location, the current vehicle speed, the acceleration/deceleration and/ or the vehicle lean angle obtained using the vehicle body sensors 90 can be complemented based on the current vehicle location, the current vehicle speed, the acceleration/ deceleration and/or the vehicle lean angle obtained using the GPS/IMU 134, and vice versa, to improve the accuracy of the data. Furthermore, the current vehicle location can be based on global coordinate system such as longitude/latitude, East (m)/North (m) and the like, or local coordinate system.

On the other hand, as illustrated in FIG. 5, the future running condition recognition module 160 of the external ECU 132 obtains the future running condition data (recognition process P4) provided from one or more future running condition data sources (recognition process P3).

In the illustrated embodiment, the future running condition data source can include one or more of the followings, for example:

(FS1) Internal Data Storage;
(FS2) Sensors; and
(FS3) External Data Storage.

Specifically, the internal data storage of the future running condition data source (FS1) includes a data storage provided to the external vehicle actuator 100, such as the data storage 140. The sensors of the future running condition data source (FS2) include the vehicle body sensors 90 (FIG. 2), the GPS/IMU 134 and the camera 136, for example. The external data storage of the future running condition data source (FS3) includes an external data storage outside the vehicle 10, such as a database or cloud.

As illustrated in FIG. 5, the internal data storage of the future running condition data source (FS1) provides prescribed vehicle running condition data. The prescribed vehicle running condition data includes a given guidance that is stored in advance, such as a predetermined target speed profile, prescribed road information, and the like. Specifically, in the illustrated embodiment, the road information includes information about road slope/camber/bank, bumps, manholes and the like. In the illustrated embodiment, the predetermined target speed profile is stored in advance in the data storage 140. In the illustrated embodiment, the predetermined target speed profile can include a plurality of different speed profiles for a predetermined target path, and the different speed profiles can be selectively switched during traveling along the predetermined target path using an external command. With this prescribed vehicle running condition data, future running condition of the vehicle 10 in both of the distant future and the near future can be estimated with high probability, especially while traveling in a closed course. However, the prescribed vehicle running condition data is not limited to the above-mentioned data, and does not need to include all of the data mentioned above, as may be needed and/or desired.

As illustrated in FIG. 5, the sensors of the future running condition data source (FS2) provide sensed vehicle running condition data. The sensed vehicle running condition data includes sensed data sensed by the vehicle body sensors 90 (FIG. 2), the GPS/IMU 134 and the camera 136, for example. In the illustrated embodiment, the sensed vehicle running condition data is obtained based on the image captured by the camera 136, for example. In this case, the sensed vehicle running condition data includes road information, traffic information, and the like. The road information can include information about road slope/camber/bank, bumps, manholes, road surface condition, and the like. The traffic information can include information about traffic signals, traffic signs (e.g., speed limit signs, stop signs, etc.), pedestrians around the vehicle 10, vehicles around the vehicle 10, and the like. With this sensed vehicle running condition data, future running condition of the vehicle 10 in the near future can be estimated with high probability while traveling in a closed course or in an open course. However, the sensed vehicle running condition data is not limited to the above-mentioned data, and does not need to include all of data mentioned above, as may be needed and/or desired.

As illustrated in FIG. 5, the external data storage of the future running condition data source (FS3) provides transmitted vehicle running condition data. The transmitted vehicle running condition data includes data transmitted and received from an external database or cloud through the transceiver 138, for example. In the illustrated embodiment, the transmitted vehicle running condition data includes traffic information, for example. The traffic information can include information about traffic signals, traffic signs (e.g., speed limit signs, stop signs, etc.), traffic flows (or traffic congestions), and the like. This traffic information can be obtained in a conventional manner as used in navigation systems. The transmitted vehicle running condition data can also include road information. The road information can include information about road slope/camber/bank, bumps, manholes, road surface condition, road elevation based on a 3D map, and the like. The transmitted vehicle running condition data can also include weather information, temperature information, friction coefficient information, and the like. Furthermore, the transmitted vehicle running condition data can include operational commands transmitted from a ground station and received through the transceiver 138, for example. Specifically, a human operator of the ground station can operate the ground station to transmit the operational commands for operating the vehicle 10 using the external vehicle actuator 100. For example, the operation commands can include commands for changing the vehicle speed, vehicle acceleration/deceleration, and the like. Furthermore, the operation commands can include a command to selectively switch the different speed profiles of the predetermined target speed profile during traveling. In this case, the command can indicate an aggressiveness for the traveling of the vehicle 10 to switch the different speed profiles that correspond to different aggressiveness, respectively. With this transmitted vehicle running condition data, a future running condition of the vehicle 10 in both the distant future and the near future can be estimated with high probability while traveling in a closed course or in an open course. However, the transmitted vehicle running condition data is not limited to the above-mentioned data, and does not need to include all of data mentioned above, as may be needed and/or desired.

The data storage 140 stores future running condition data (i.e., one or more of the prescribed vehicle running condition data, the sensed vehicle running condition data and the transmitted vehicle running condition data) provided from one or more of the future running condition data sources (FS1)-(FS3) above. Then, the future running condition recognition module 160 of the external ECU 132 obtains the future running condition data from the data storage 140 (recognition process P4). However, the future running condition recognition module 160 does not need to obtain the future running condition data from all of the future running condition data sources (FS1)-(FS3) above. The future running condition recognition module 160 can obtain the future running condition data form one or more of the future running condition data sources (FS1)-(FS3) above, as may be needed and/or desired for the gear shift control. Also, the future running condition recognition module 160 can obtain the future running condition data from any other future running condition data sources, as may be needed and/or desired.

In the illustrated embodiment, as illustrated in FIG. 5, the future running condition data obtained by the future running condition recognition module 160 can include one or more of the followings, for example:

(F1) Future Vehicle Speed;
(F2) Future Road Slope/Camber/Bank; and
(F3) Future Road Surface Condition.

Specifically, in the illustrated embodiment, the running condition data can include at least the future vehicle speed of the vehicle 10, and can additionally and optionally include the future road slope/camber/bank and/or the future road surface condition, for example. In other words, the future running condition recognition module 160 can obtain the future running condition data (F1), or the future running condition data (F1) and either or both of the future running condition data (F2) and (F3) above, as may be needed and/or desired for the gear shift control. Also, the future running condition recognition module 160 can obtain any other future running condition data as may be needed and/or desired.

In the illustrated embodiment, the future vehicle speed of the future running condition data (F1) can be determined based on various data from one or more of the future running condition data sources (FS1)-(FS3). The future running condition recognition module 160 can obtain the future vehicle speed based on the predetermined target speed profile stored in the data storage 140 (i.e., the future running condition data source (FS1)). However, the future running condition recognition module 160 can also update the future vehicle speed obtained from the predetermined target speed profile based on any other data obtained from the future running condition data sources (FS1)-(FS3). For example, the future running condition recognition module 160 can update the future vehicle speed obtained from the predetermined target speed profile based on the road information, the traffic information, the weather information, the temperature information, the friction coefficient information obtained from one or more of the future running condition data sources (FS1)-(FS3). Furthermore, the future vehicle speed of the future running condition data (F1) can be calculated using the current running condition data without the predetermined target speed profile. For example, the future vehicle speed can be calculated using the current vehicle location, the current vehicle speed, the acceleration/deceleration, and the like. In the illustrated embodiment, the future vehicle speed of the future running condition data (F1) can be utilized for the gear shift control by considering the future vehicle speed itself. Further, the gear shift control can be performed by considering the future vehicle speed with any other future vehicle running condition, such as an estimated driving torque, an estimated engine rotational speed, an estimated throttle opening angle, and the like. With this configuration, unnecessary gear shifts can be avoided by considering the future vehicle running condition.

Also, in the illustrated embodiment, the future road slope of the future running condition data (F2) is data indicating a road slope in a traveling direction of the vehicle 10 at a future vehicle location. In the illustrated embodiment, the gear shift control can be performed by considering the future road slope. For example, if a downslope or downhill is determined based on the future road slope of the future running condition data (F2), then the gear shift control can be performed to select a proper gear stage for efficient engine braking (e.g., gear downshift), which avoids frequent brake operations. Also, if an upslope or uphill is determined based on the future road slope of the future running condition data (F2), then the gear shift control can be performed to select a proper gear stage to obtain enough driving torque to climb the slope with the target vehicle speed (e.g., gear downshift). Also, in the illustrated embodiment, the future road camber of the future running condition data (F2) is data indicating a road slope between a curb and a crown in a lateral direction of the vehicle 10. In the illustrated embodiment, the gear shift control can be performed by considering the future road camber. For example, if the future road camber is considered, then the maneuverability of the vehicle 10 during the gear shift control can further be improved, especially in case of leaning vehicles, such as motorcycles. Also, in the illustrated embodiment, the future road bank of the future running condition data (F2) is data indicating an entire road slope in a lateral direction of the vehicle 10. In the illustrated embodiment, the gear shift control can be performed by considering the future road bank. For example, if the future road bank is considered, then the maneuverability of the vehicle 10 during the gear shift control can further be improved, especially in case of leaning vehicles, such as motorcycles.

Furthermore, in the illustrated embodiment, the future road surface condition of the future running condition data (F3) is data indicating roughness, bump and slipperiness of the road. In the illustrated embodiment, the gear shift control can be performed by considering the future road surface condition. For example, if the future road surface condition is considered, then the maneuverability of the vehicle 10 during the gear shift control can further be improved, especially in case of leaning vehicles, such as motorcycles.

Referring to FIG. 5, the main control module 150 of the external ECU 132 determines the shift operation (upshift or downshift) of the vehicle 10 (gear shift judgement process P5). Specifically, the main control module 150 determines the shift operation based on the current running condition data from the current running condition recognition module 158 (obtained through recognition processes P1 and P2) and the future running condition data from the future running condition recognition module 160 (obtained through recognition processes P3 and P4).

Figure 6:
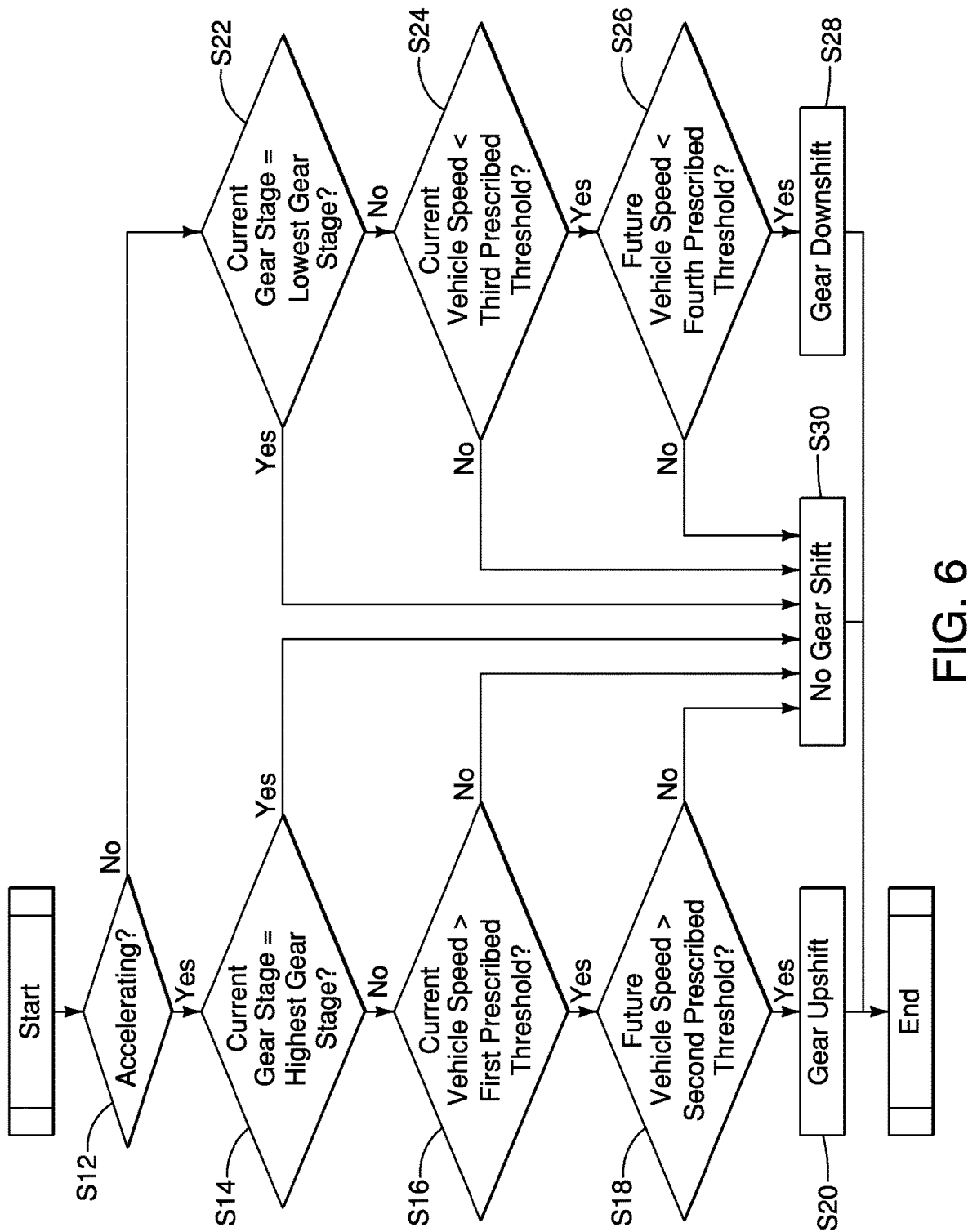
FIG. 6 is a flowchart illustrating a gear shift judgement process in the gear shift control illustrated in FIG. 5.

Referring now to FIGS. 6-8, the gear shift judgement process P5 performed by the main control module 150 will be described in detail. In the illustrated embodiment, the main control module 150 performs the gear shift judgement process P5 by utilizing the future vehicle speed of the future running condition data (F1) obtained from the data storage 140 of the future running condition data source (FS1) as the future running condition data for determining the shift operation.

As illustrated in FIG. 6, the main control module 150 repeatedly performs the gear shift judgement processes P5 at a predetermined interval while the vehicle 10 is traveling. In step S12, the main control module 150 determines whether the vehicle 10 is accelerating based on the acceleration of the vehicle 10 (the current running condition data (C3)). If the main control module 150 determines that the vehicle 10 is accelerating (Yes in step S12), then the main control module 150 determines whether the current gear stage is at the highest gear stage based on the current gear stage of the vehicle 10 (the current running condition data (C7)) (step S14). If the main control module 150 determines that the current gear stage is not at the highest gear stage (No in step S14), then the main control module 150 determines whether the current vehicle speed is above a first prescribed threshold for the current gear stage based on the current vehicle speed of the vehicle 10 (the current running condition data (C2)) (step S16). If the main control module 150 determines that the current vehicle speed is above the first prescribed threshold for the current gear stage (Yes in step S16), then the main control module 150 determines whether the future vehicle speed is above a second prescribed threshold for the current gear stage based on the future vehicle speed of the vehicle 10 (the future running condition data (F1)) (step S18). If the main control module 150 determines that the future vehicle speed is above the second prescribed threshold for the current gear stage (Yes in step S18), then the main control module 150 determines to perform the gear upshift (step S20).

On the other hand, if the main control module 150 determines that the current gear stage is at the highest gear stage (Yes in step S14), that the current vehicle speed is not above the first prescribed threshold for the current gear stage (No in step S16), or that the future vehicle speed is not above the second prescribed threshold for the current gear stage (No in step S18), then the main control module 150 determines not to perform the gear shift (step S30).

Furthermore, if the main control module 150 determines that the vehicle 10 is not accelerating (No in step S12), then the main control module 150 determines whether the current gear stage is at the lowest gear stage based on the current gear stage of the vehicle 10 (the current running condition data (C7)) (step S22). If the main control module 150 determines that the current gear stage is not at the lowest gear stage (No in step S22), then the main control module 150 determines whether the current vehicle speed is below a third prescribed threshold for the current gear stage based on the current vehicle speed of the vehicle 10 (the current running condition data (C2)) (step S24). If the main control module 150 determines that the current vehicle speed is below the third prescribed threshold for the current gear stage (Yes in step S24), then the main control module 150 determines whether the future vehicle speed is below a fourth prescribed threshold for the current gear stage based on the future vehicle speed of the vehicle 10 (the future running condition data (F1)) (step S26). If the main control module 150 determines that the future vehicle speed is below the fourth prescribed threshold for the current gear stage (Yes in step S26), then the main control module 150 determines to perform the gear downshift (step S28).

On the other hand, if the main control module 150 determines that the current gear stage is at the lowest gear stage (Yes in step S22), that the current vehicle speed is not below the third prescribed threshold for the current gear stage (No in step S24), or that the future vehicle speed is not below the fourth prescribed threshold for the current gear stage (No in step S26), then the main control module 150 determines not to perform the gear shift (step S30).

FIG. 7 illustrates a gear upshift table having the first and second prescribed thresholds for determining gear upshift, while FIG. 8 illustrates a gear downshift table having the third and fourth prescribed thresholds for determining gear downshift. The gear upshift table in FIG. 7 is utilized while the main control module 150 determines that the vehicle 10 is accelerating (Yes in step S12). The gear downshift table in FIG. 8 is utilized while the main control module 150 determines that the vehicle 10 is not accelerating (No in step S12).

As shown in FIG. 7, the first and second prescribed thresholds are prescribed for each current gear stage. In the illustrated embodiment, the first and second prescribed thresholds for the first gear stage (i.e., for the gear upshift from the first gear stage to the second gear stage) are set to 50 (km/h) and 80 (km/h), respectively. Also, the first and second prescribed thresholds for the second gear stage (i.e., for the gear upshift from the second gear stage to the third gear stage) are set to 115 (km/h) and 140 (km/h), respectively. Although not shown in FIG. 7, the first and second prescribed thresholds for the third, fourth and fifth gear stages are also prescribed in the gear upshift table. However, the values for the first and second prescribed thresholds are not limited to the values shown in the gear upshift table in FIG. 7. In the illustrated embodiment, the first prescribed threshold for the current gear stage is set to be smaller than the second prescribed threshold for the current gear stage. Also, in the illustrated embodiment, the first prescribed threshold becomes larger as the current gear stage becomes higher, and the second prescribed threshold becomes larger as the current gear stage becomes higher.

Similarly, as shown in FIG. 8, the third and fourth prescribed thresholds are prescribed for each current gear stage. In the illustrated embodiment, the third and fourth prescribed thresholds for the second gear stage (i.e., for the gear downshift from the second gear stage to the first gear stage) are set to 70 (km/h) and 40 (km/h), respectively. Also, the third and fourth prescribed thresholds for the third gear stage (i.e., for the gear downshift from the third gear stage to the second gear stage) are set to 130 (km/h) and 105 (km/h), respectively. Although not shown in FIG. 8, the third and fourth prescribed thresholds for the fourth, fifth and sixth gear stages are also prescribed in the gear downshift table. However, the values for the third and fourth prescribed thresholds are not limited to the values shown in the gear downshift table in FIG. 8. In the illustrated embodiment, the third prescribed threshold for the current gear stage is set to be larger than the fourth prescribed threshold for the current gear stage. Also, in the illustrated embodiment, the third prescribed threshold becomes larger as the current gear stage becomes higher, and the fourth prescribed threshold becomes larger as the current gear stage becomes higher. In the illustrated embodiment, as illustrated in FIGS. 6-8, the main control module 150 of the external ECU 132 is configured to determine the gear shift based on the current vehicle speed (e.g., in steps S16 and S24) and the future vehicle speed (e.g., in steps S18 and S26). However, the main control module 150 of the external ECU 132 can determine the gear shift in a different manner. Specifically, the main control module 150 of the external ECU 132 can be configured not to use the current vehicle speed to determine the gear shift. For example, the main control module 150 of the external ECU 132 can be configured to determine the gear shift based on any other current running condition data other than the current vehicle speed. In particular, the main control module 150 of the external ECU 132 can perform processing in steps S16 and S24 in FIG. 6 using the throttle opening angle, the engine rotation speed, and the like, for example.

Figure 9:
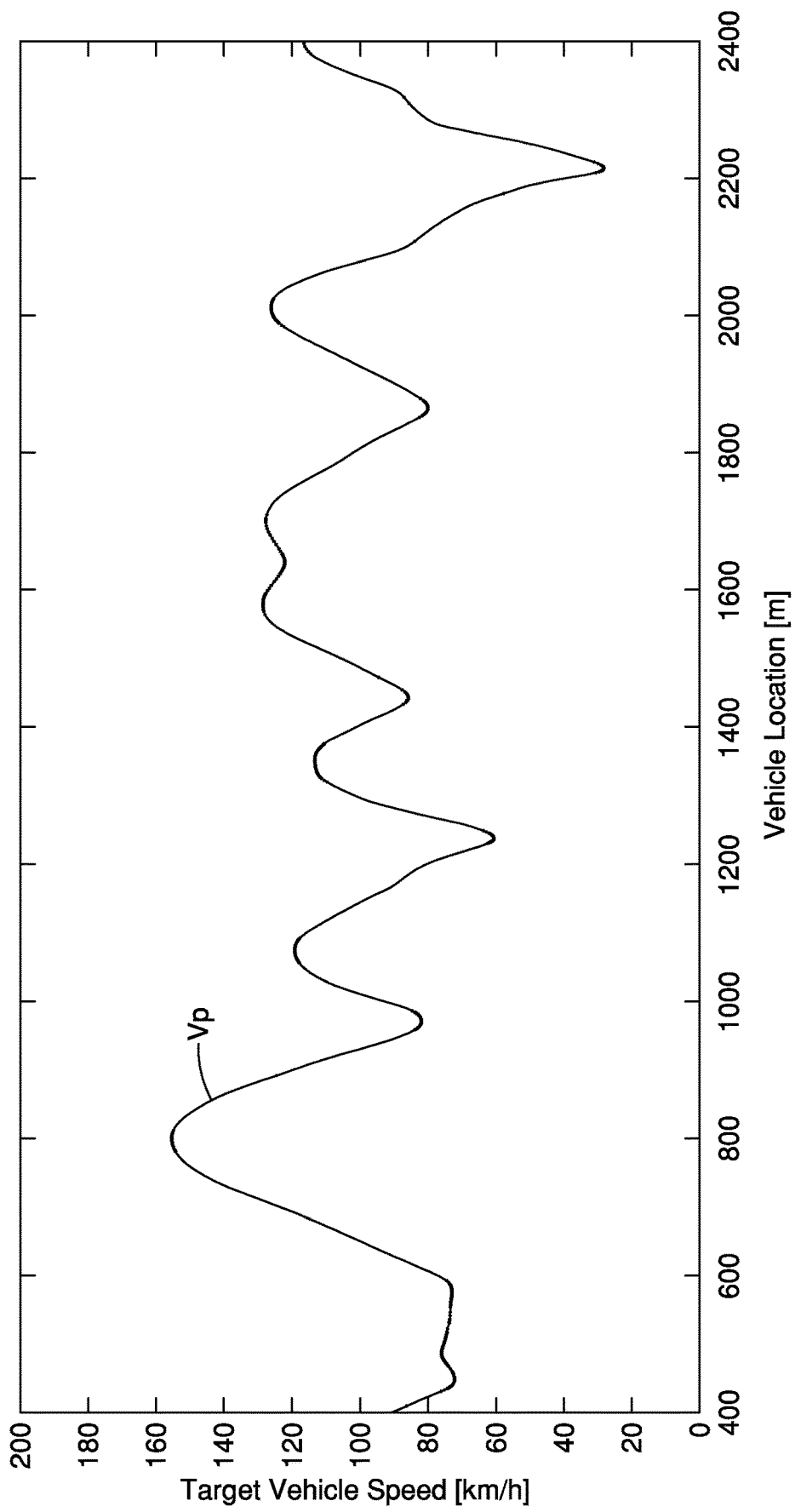
FIG. 9 is an example of a target vehicle speed versus vehicle location graph of a predetermined vehicle speed profile.
Figure 10:
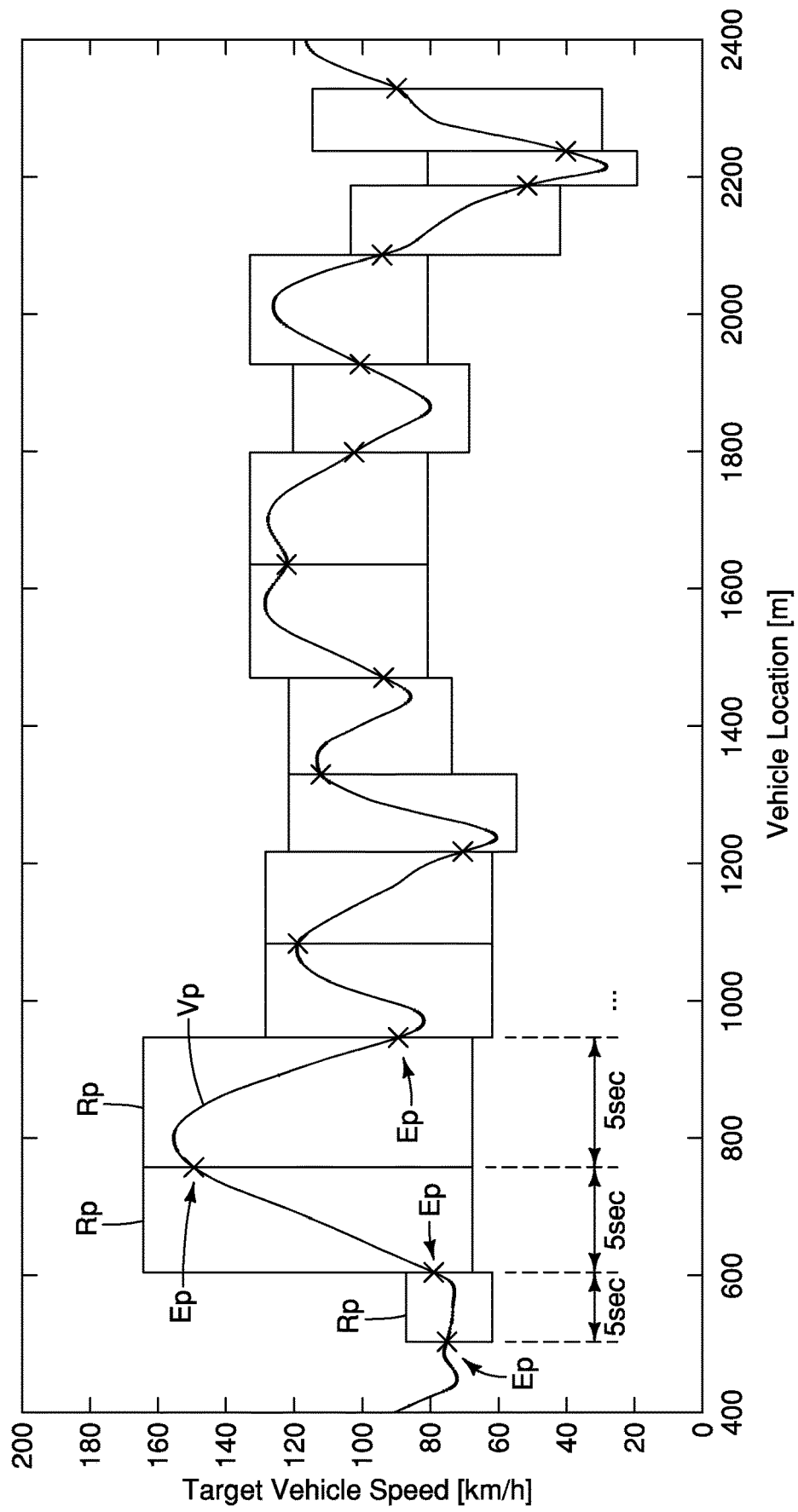
FIG. 10 is the target vehicle speed versus vehicle location graph of the predetermined vehicle speed profile, illustrating the predetermined vehicle speed profile being divided into data processing ranges for determining a future vehicle speed.

Referring now to FIGS. 9-12, an algorithm for determining the future vehicle speed used in steps S18 and S26 in FIG. 6 will now be described in detail. FIG. 9 illustrates an example of a predetermined target speed profile Vp stored in the data storage 140. As illustrated in FIG. 9, the predetermined target speed profile Vp indicates the target vehicle speed in association with a vehicle location. The main control module 150 obtains the predetermined target speed profile Vp from the data storage 140. As illustrated in FIG. 10, the main control module 150 divides the predetermined target speed profile Vp into a plurality of data processing ranges Rp each having a predetermined time distance. In the illustrated embodiment, the predetermined time distance is set to 5 seconds. However, the predetermined time distance can be set to different value, as may be needed and/or desired. Furthermore, the main control module 150 can divide the predetermined target speed profile Vp into a plurality of data processing ranges Rp in a different manner. For example, the main control module 150 can divide the predetermined target speed profile Vp into a plurality of data processing ranges Rp each corresponding to a predetermined distance (m). Furthermore, for example, the main control module 150 can divide the predetermined target speed profile Vp into a plurality of data processing ranges Rp each having different time distance or each corresponding to different distance. In FIG. 10, the data processing ranges Rp are illustrated with a rectangle. The main control module 150 also determines end points Ep of the data processing ranges Rp. In FIG. 10, the end points Ep are illustrated with a cross.

Figure 11:
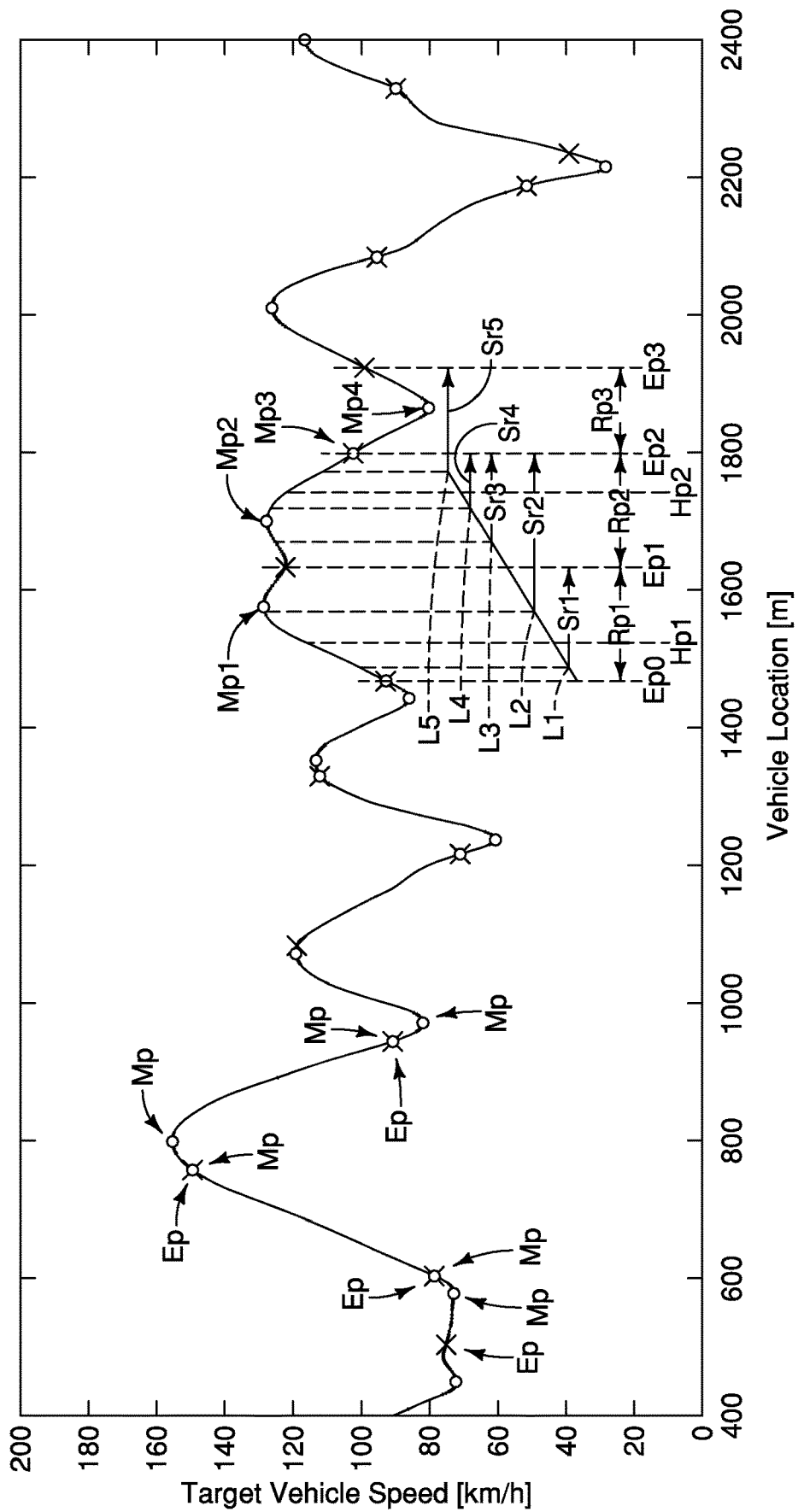
FIG. 11 is the target vehicle speed versus vehicle location graph of the predetermined vehicle speed profile, illustrating a search range for determining the future vehicle speed being set relative to a current vehicle location.

Furthermore, as illustrated in FIG. 11, the main control module 150 sequentially searches a max/min point Mp next to the current vehicle location within a search range that is determined based on the current vehicle location. The max/min point Mp is a point with a local maximum or minimum vehicle speed within the search range next to the current vehicle location. The max/min point Mp can be located at relative extrema of the predetermined target speed profile Vp, or at an end point Ep of the search range. In FIG. 11, the max/min points Mp are illustrated with a circle.

Specifically, the main control module 150 sequentially determines an acceleration/deceleration trend of the predetermined target speed profile Vp from the current vehicle location within the search range. Furthermore, the main control module 150 determines the next change point of the acceleration/deceleration trend of the predetermined target speed profile Vp next to the current vehicle location. Then, the main control module 150 determines the next change point of the acceleration/deceleration trend (i.e., next relative extrema) as the max/min point Mp. On the other hand, if there is no change point of the acceleration/deceleration trend within the search range, then the main control module 150 determines an end point Ep of the search range as the max/min point Mp.

In the illustrated embodiment, the main control module 150 sequentially searches the max/min point Mp next to the current vehicle location while the vehicle 10 is traveling, and determines the target vehicle speed at the max/min point Mp as the future vehicle speed. The max/min point Mp can be uniquely determined relative to the current vehicle location. Thus, the main control module 150 can calculate the max/min points Mp in advance, and store the future vehicle speed in association with the current vehicle location.

The search range for searching the max/min point Mp is determined based on the current vehicle location within the data processing range Rp in which the current vehicle location is located. Specifically, in the illustrated embodiment, the search range is set to be a data range between a point corresponding to the current vehicle location and the next end point Ep of the data processing range Rp, in which the current vehicle location is located, before the current vehicle location reaches a half point (in time distance) of the data processing range Rp. On the other hand, in the illustrated embodiment, the search range is set to be a data range between a point corresponding to the current vehicle location and the end point Ep of the next data processing range Rp next to the data processing range Rp, in which the current vehicle location is located, after the current vehicle location passes the half point of the data processing range Rp.

Referring now to FIG. 11, the determination of the future vehicle speed will further be discussed in detail.

As illustrated in FIG. 11, while the vehicle 10 is travelling at a current vehicle location L1 within a data processing range Rp1 between an end point Ep0 and a half point Hp1 of the data processing range Rp1, a search range Sr1 is set to a data range between the current vehicle location L1 and the next end point Ep1 of the data processing range Rp1. The main control module 150 determines the next max/min point Mp1 from the current vehicle location L1 by searching the search range Sr1, and then determines the target vehicle speed at the max/min point Mp1 as the future vehicle speed for the current vehicle location L1.

Furthermore, while the vehicle 10 is travelling at a current vehicle location L2 within the data processing range Rp1 between the half point Hp1 and the end point Ep1, then a search range Sr2 is set to a data range between the current vehicle location L2 and the end point Ep2 of the next data processing range Rp2 that is next to the data processing range Rp1 in which the vehicle 10 is travelling. The main control module 150 determines the next max/min point Mp1 from the current vehicle location L2 by searching the search range Sr2, and then determines the target vehicle speed at the max/min point Mp1 as the future vehicle speed for the current vehicle location L2.

Also, while the vehicle 10 is travelling at a current vehicle location L3 within the data processing range Rp2 between the end point Ep1 and a half point Hp2 of the data processing range Rp2, a search range Sr3 is set to a data range between the current vehicle location L3 and the next end point Ep2 of the data processing range R2. The main control module 150 determines the next max/min point Mp2 from the current vehicle location L3 by searching the search range Sr3, and then determines the target vehicle speed at the max/min point Mp2 as the future vehicle speed for the current vehicle location L3.

Also, while the vehicle 10 is travelling at a current vehicle location L4 within the data processing range Rp2 between the end point Ep1 and the half point Hp2 of the data processing range Rp2, a search range Sr4 is set to a data range between the current vehicle location L4 and the next end point Ep2 of the data processing range R2. The main control module 150 determines the next max/min point Mp3, which is located at the next end point Ep2, from the current vehicle location L3 by searching the search range Sr4, and then determines the target vehicle speed at the max/min point Mp3 as the future vehicle speed for the current vehicle location L4.

Also, while the vehicle 10 is travelling at a current vehicle location L5 within the data processing range Rp2 between the half point Hp2 and the end point Ep2 of the data processing range Rp2, a search range Sr5 is set to a data range between the current vehicle location L5 and the end point Ep3 of the next data processing range Rp3. The main control module 150 determines the next max/min point Mp4 from the current vehicle location L3 by searching the search range Sr4 since the max/min point Mp3 is not determined as a change point of the acceleration/deceleration trend while the search range Sr4 is searched. The main control module 150 then determines the target vehicle speed at the max/min point Mp4 as the future vehicle speed for the current vehicle location L5.

Alternatively, the main control module 150 can determine the max/min points Mp in a different manner. For example, the main control module 150 can merely search within a data processing range Rp between the current vehicle location and the end point Ep of the data processing range Rp regardless of the current vehicle location within the data processing range Rp while the vehicle 10 is traveling within a range corresponding to the data processing range Rp.

Figure 12:
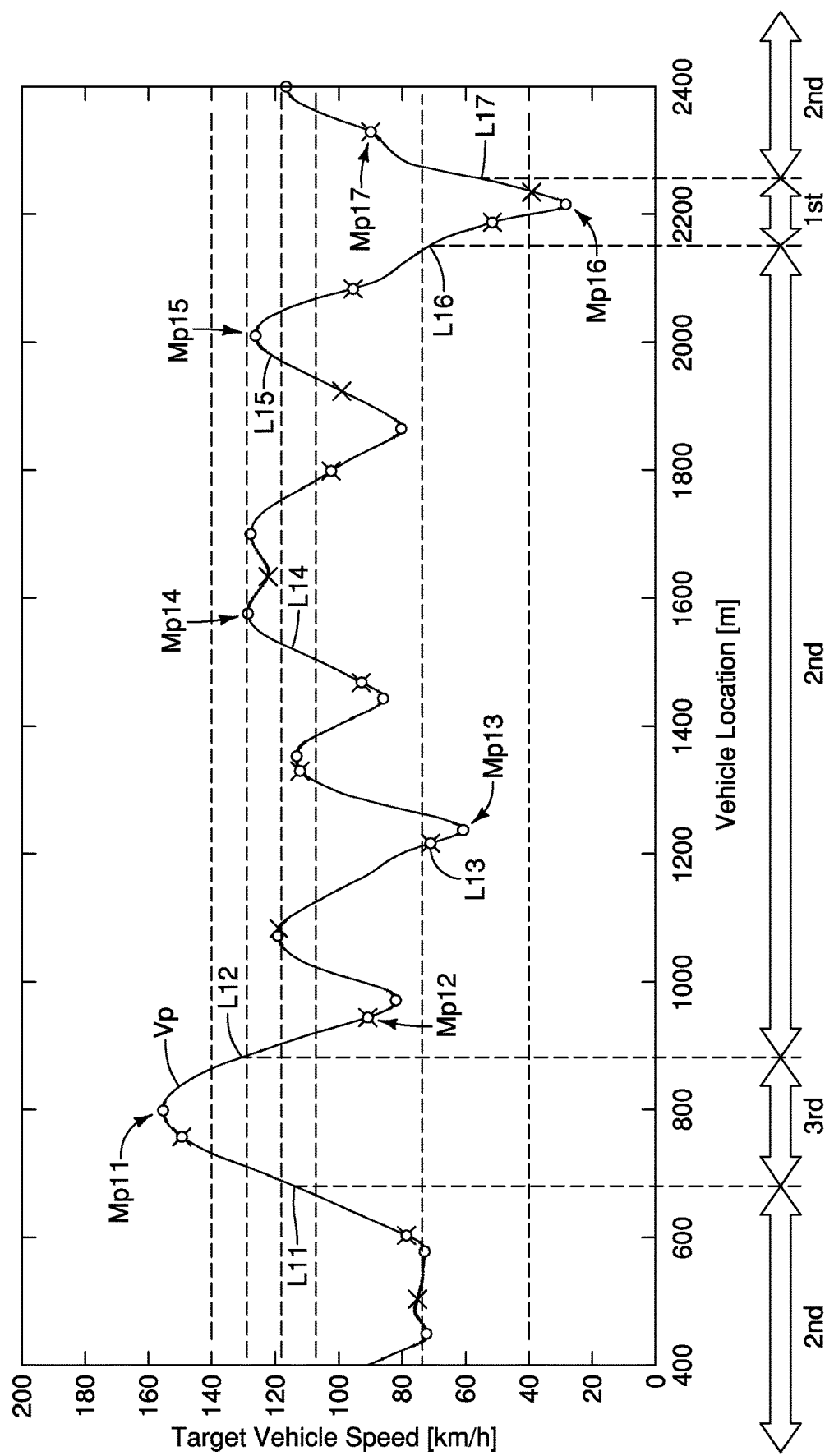
FIG. 12 is the target vehicle speed versus vehicle location graph of the predetermined vehicle speed profile, explaining the gear shift judgement process illustrated in FIG. 6.

Referring now to FIGS. 6 and 12, the gear shift judgement process P5 will further be described in detail. For the sake of simplicity, it is assumed that the vehicle 10 is travelling at the same speed as the target vehicle speed at the current vehicle location.

When the vehicle 10 is traveling at a current vehicle location L11, the main control module 150 determines that the vehicle 10 is accelerating (Yes in step S12). As illustrated in FIG. 12, since the current gear stage is at the second gear stage, the main control module 150 also determines that the current gear stage is not at the highest gear stage (No in step S14). Furthermore, the main control module 150 determines that the current vehicle speed is above 115 (km/h) (i.e., the first prescribed threshold for the second gear stage) (Yes in step S16). The main control module 150 also determines that the future vehicle speed (e.g., the target vehicle speed at the next max/min point Mp11) is above 140 (km/h) (i.e., the second prescribed threshold for the second gear stage) (Yes in step S18). Thus, the main control module 150 determines to perform the gear upshift from the second gear stage to the third gear stage (step S20).

When the vehicle 10 is traveling at a current vehicle location L12, the main control module 150 determines that the vehicle 10 is not accelerating (No in step S12). As illustrated in FIG. 12, since the current gear stage is at the third gear stage, the main control module 150 also determines that the current gear stage is not at the lowest gear stage (No in step S22). Furthermore, the main control module 150 determines that the current vehicle speed is below 130 (km/h) (i.e., the third prescribed threshold for the third gear stage) (Yes in step S24). The main control module 150 also determines that the future vehicle speed (e.g., the target vehicle speed at the next max/min point Mp12) is below 105 (km/h) (i.e., the fourth prescribed threshold for the third gear stage) (Yes in step S26). Thus, the main control module 150 determines to perform the gear downshift from the third gear stage to the second gear stage (step S28).

When the vehicle 10 is traveling at a current vehicle location L13, the main control module 150 determines that the vehicle 10 is not accelerating (No in step S12), and that the current gear stage is not at the lowest gear stage (No in step S22). The main control module 150 further determines that the current vehicle speed is below 70 (km/h) (i.e., the third prescribed threshold for the second gear stage) (Yes in step S24), but that the future vehicle speed (e.g., the target vehicle speed at the next max/min point Mp13) is not below 40 (km/h) (i.e., the fourth prescribed threshold for the second gear stage) (No in step S26). Thus, the main control module 150 determines not to perform the gear shift (step S30).

When the vehicle 10 is traveling at a current vehicle location L14 or L15, the main control module 150 determines that the vehicle 10 is accelerating (Yes in step S12), and that the current gear stage is not at the highest gear stage (No in step S14). The main control module 150 further determines that the current vehicle speed is above 115 (km/h) (i.e., the first prescribed threshold for the second gear stage) (Yes in step S16), but that the future vehicle speed (e.g., the target vehicle speed at the next max/min point Mp14 or Mp15) is not above 140 (km/h) (i.e., the second prescribed threshold for the second gear stage) (No in step S18). Thus, the main control module 150 determines not to perform the gear shift (step S30).

When the vehicle 10 is traveling at a current vehicle location L16, the main control module 150 determines that the vehicle 10 is not accelerating (No in step S12), and that the current gear stage is not at the lowest gear stage (No in step S22). The main control module 150 further determines that the current vehicle speed is below 70 (km/h) (i.e., the third prescribed threshold for the second gear stage) (Yes in step S24), and that the future vehicle speed (e.g., the target vehicle speed at the next max/min point Mp16) is below 40 (km/h) (i.e., the fourth prescribed threshold for the second gear stage) (Yes in step S26). Thus, the main control module 150 determines to perform the gear downshift from the second gear stage to the first gear stage (step S28).

When the vehicle 10 is traveling at a current vehicle location L17, the main control module 150 determines that the vehicle 10 is accelerating (Yes in step S12), and that the current gear stage is not at the highest gear stage (No in step S14). The main control module 150 further determines that the current vehicle speed is above 50 (km/h) (i.e., the first prescribed threshold for the first gear stage) (Yes in step S16). The main control module 150 also determines that the future vehicle speed (e.g., the target vehicle speed at the next max/min point Mp17) is above 80 (km/h) (i.e., the second prescribed threshold for the first gear stage) (Yes in step S18). Thus, the main control module 150 determines to perform the gear upshift from the first gear stage to the second gear stage (step S20).

Referring to FIG. 5, the main control module 150 of the external ECU 132 outputs to the gear shift control module 152 the shift operation signal that indicates the shift operation (upshift or downshift) determined through the gear shift judgement process P5. In response, the gear shift control module 152 performs the gear shift operation (gear shift operation process P6). In particular, the gear shift control module 152 outputs the control signal to the shift pedal actuator 122 to physically operate the shift pedal 39 of the vehicle 10 for performing the shift operation (upshift or downshift). Also, the gear shift control module 152 outputs a clutch operation signal to the clutch lever actuator 118 and accelerator operation signal to the accelerator actuator 114 to physically operate the clutch lever 35 and the accelerator 31 for performing the shift operation (upshift or downshift).

In the illustrated embodiment, the predetermined target speed profile is preset and stored in advance in the data storage 140, and obtained by the future running condition recognition module 160 of the external ECU 132. However, the future running condition recognition module 160 of the external ECU 132 can also be configured to calculate a target speed profile. For example, as illustrated in FIG. 13A, the future running condition recognition module 160 can be configured to calculate a target speed profile based on road information of a road RD on which the vehicle 10 is travelling. In particular, the future condition recognition module 160 obtains the future road slope/camber/bank of the road RD (i.e., the future running condition data (F2)) and/or the future road surface condition of the road RD (i.e., the future running condition data (F3)). Also, the future running condition recognition module 160 can obtain other type of road information, such as a curvature of the road RD, from map data stored in the data storage 140, for example. Then, the future running condition recognition module 160 calculates the target speed profile for a target path defined along the road RD based on the obtained road information. For example, the target speed profile can be calculated in advance such that the target vehicle speed decreases at a curve (see FIG. 13A) in the future vehicle location, such that the target vehicle speed decreases at a bump and/or a manhole in the future vehicle location, such that the target vehicle speed changes at an uphill/downhill in the future vehicle location and/or such that the target vehicle speed decreases at a large camper in the future vehicle location. Also, the target speed profile can be calculated in advance such that the target vehicle speed decreases at a future vehicle location with a wet or freezing road surface.

Figure 13B:
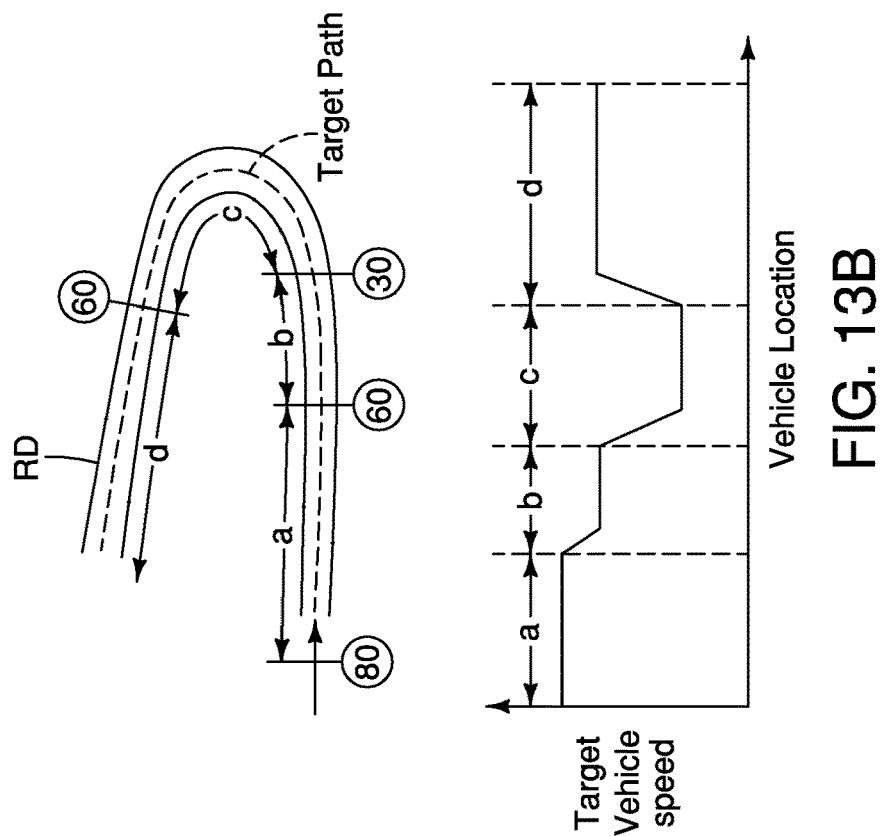
FIG. 13B is a schematic diagram illustrating a target speed profile being produced based on traffic information.
Figure 13A:
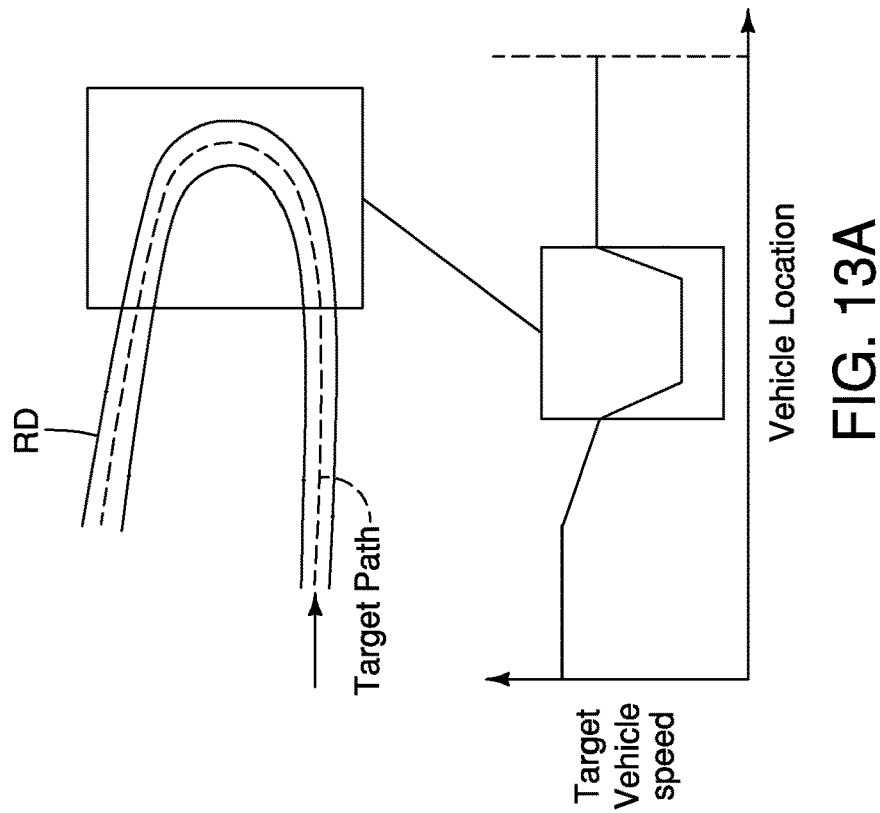
FIG. 13A is a schematic diagram illustrating a target speed profile being produced based on road information.

Also, as illustrated in FIG. 13B, the future running condition recognition module 160 can also be configured to calculate a target speed profile based on traffic information of a road RD on which the vehicle 10 is travelling. In particular, the future running condition recognition module 160 obtains the traffic information, such as the traffic signals, the traffic signs, and the like. Then, the future running condition recognition module 160 calculates the target speed profile for a target path defined along the road RD based on the obtained traffic information. For example, the target speed profile can be calculated such that the target vehicle speed is limited by speed limit signs along the target path. Specifically, as shown in FIG. 13B, when the speed limit signs indicate speed limits of 80 (km/h) for a road section a, 60 (km/h) for a road section b, 30 (km/h) for a road section c and 60 (km/h) for a road section d, then the target speed profile can be calculated such that the maximum speeds in the road sections a, b, c and d do not exceed the speed limits, respectively.

Figure 14:
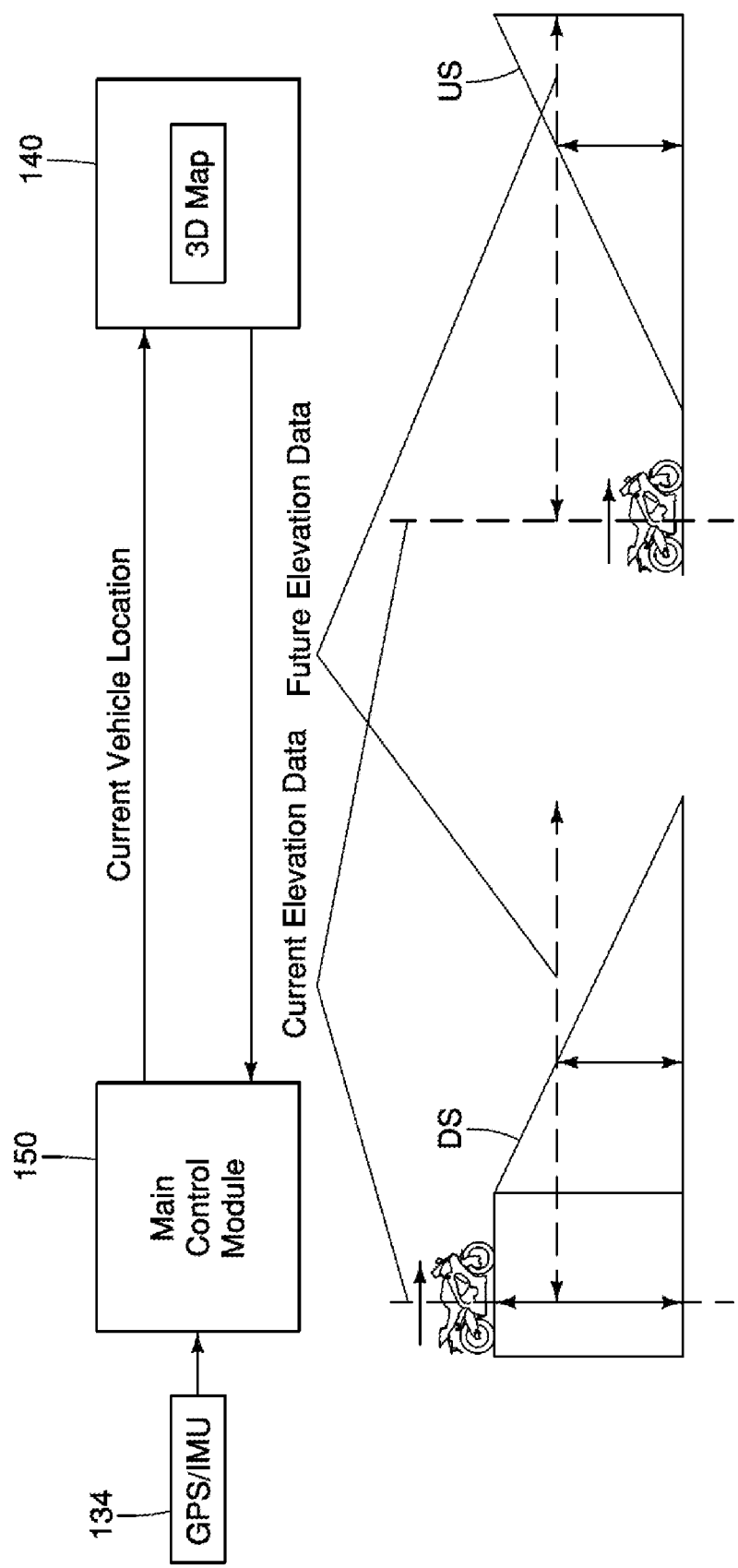
FIG. 14 is a schematic diagram illustrating a shift operation being determined based on road information at a current vehicle location and a future vehicle location.

In the illustrated embodiment, the main control module 150 can perform the gear shift control further based on 2D or 3D map data. Specifically, as illustrated in FIG. 14, the main control module 150 can obtain the current vehicle location from the GPS/IMU 134, and then obtain elevation data for the current vehicle location and the future vehicle location from the 3D map data based on the current vehicle location. Then, the main control module 150 can determine a change in the road slope. For example, the main control module 150 can downshift the gear stages of the transmission mechanism 40 to maintain the future vehicle speed upon determining the change in the road slope.

For example, as illustrated in FIG. 14, when the main control module 150 determines a downslope DS at the future vehicle location while traveling on level ground, an upslope or the like, then the main control module 150 can output the shift operation signal that indicates the downshift to the gear shift control module 152. With this configuration, the gear shift control can be performed to select a proper gear stage for efficient engine braking, which avoids frequent brake operations. Also, as illustrated in FIG. 14, when the main control module 150 determines an upslope US at the future vehicle location while traveling on level ground, a downslope or the like, then the main control module 150 can output the shift operation signal that indicates the downshift to the gear shift control module 152. With this configuration, the gear shift control can be performed to select a proper gear stage to obtain enough driving torque to climb the upslope US with the target vehicle speed.

In the illustrated embodiment, the main control module 150 can perform the gear shift control further based on the vehicle lean angle (and/or an angular velocity in the roll direction) (i.e., the current running condition data (C6)). For example, even if the main control module 150 determines to perform the gear upshift in step S20 in FIG. 6 or to perform the gear downshift in step S28 in FIG. 6, the main control module 150 can further determine not to perform the gear shift while the vehicle lean angle is larger than a predetermined threshold. With this configuration, the gear shift control can be properly avoided while the vehicle lean angle is large.

Figure 15:
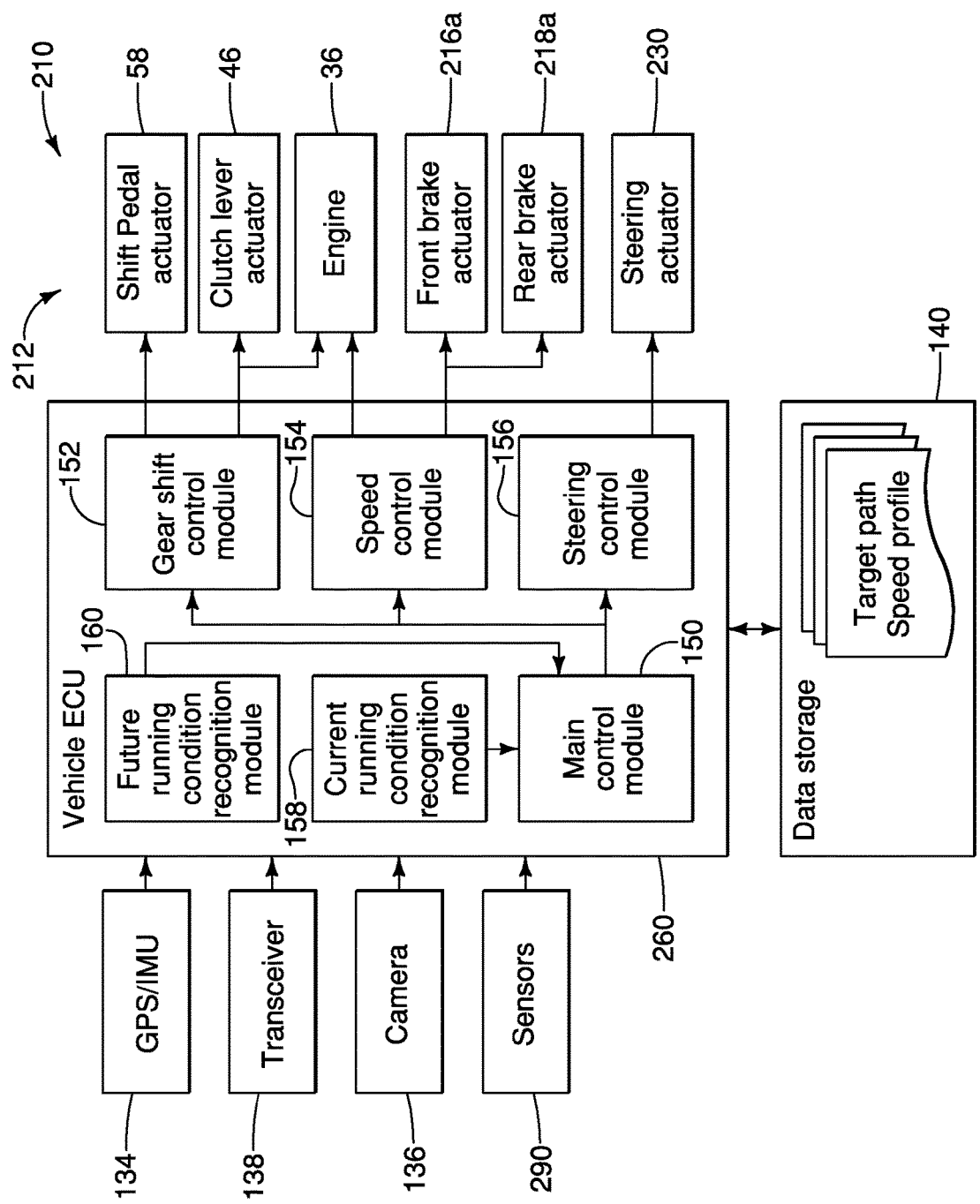
FIG. 15 illustrates a block diagram of an electronic configuration of a vehicle in accordance with a modification example.

In the illustrated embodiment, the vehicle 10 includes the external vehicle actuator 100 that is externally attached to the wheeled vehicle body 11. On the other hand, as illustrated in FIG. 15, a vehicle 210 in accordance with a modification example includes an internal vehicle actuator 212 that at least operates the transmission mechanism 40 (FIG. 2) and steers the vehicle 210. Specifically, the vehicle 210 forms an autonomous vehicle without having the external vehicle actuator 100. In view of the similarity between the vehicle 10 and the vehicle 210, the parts of the vehicle 210 that are identical to the parts of the vehicle 10 will be given the same reference numerals as the parts of the vehicle 10. Moreover, the descriptions of the parts of the vehicle 210 that are identical to the parts of the vehicle 10 may be omitted for the sake of brevity.

The vehicle 210 is similar to the vehicle 10, except that the vehicle 210 does not have physically operable parts of the wheeled vehicle body 11, such as the handlebar 30, the accelerator 31, the brake lever 33, the clutch lever 35, the brake pedal 37 and the shift pedal 39, and corresponding sensors, such as the steering sensor 82, the accelerator operation sensor 76, the brake lever operation sensor 84, the clutch lever operation sensor 72, the brake pedal operation sensor 86 and the shift pedal operation sensor 74. Furthermore, the vehicle 210 is different from the vehicle 10 in that the vehicle 210 does not have the actuators of the external vehicle actuator 100 that physically operate the physically operable parts of the wheeled vehicle body 11.

As illustrated in FIG. 15, the vehicle 210 has an electronic configuration that is similar to the electronic configuration of the vehicle 10 (FIGS. 2 and 4) to make the vehicle 210 an autonomous vehicle. Specifically, the vehicle 210 has a vehicle ECU 260 that is similar to the vehicle ECU 60 of the wheeled vehicle body 11 and also functions similarly as the external ECU 132 of the external vehicle actuator 100. The vehicle 210 also has sensors 290 that are similar to the vehicle body sensors 90 except for the above-mentioned sensors corresponding to the physically operable parts of the wheeled vehicle body 11. Thus, the sensors 290 include the engine rotational speed sensor 62, the throttle position sensor 64, the vehicle speed sensor 66, the acceleration sensor 68, the gyroscope 70, the clutch actuator sensor 78 and the shift actuator sensor 80, for example. In the illustrated embodiment, the internal vehicle actuator 212 includes at least the shift actuator 58 and steering actuator 230.

In the illustrated embodiment, as illustrated in FIG. 15, the vehicle 210 has electrically operable front and rear brake actuators 216a and 218a for applying braking power to the front and rear wheels 16 and 18 (FIG. 1) of the vehicle 210 and an electrically operable steering actuator 230 for steering the vehicle 210. The vehicle ECU 260 performs the path following control and the gear shift control in the same manner as the external ECU 132. Specifically, the vehicle ECU 260 outputs operation signals to the shift actuator 58, the clutch actuator 46, the engine 36, the front and rear brake actuators 216a and 218a and the steering actuator 230 to perform the path following control and the gear shift control.

With this configuration, the vehicle 210 can be autonomously driven without having a human driver or a humanoid driver (e.g., the external vehicle actuator 100).

Figure 16:
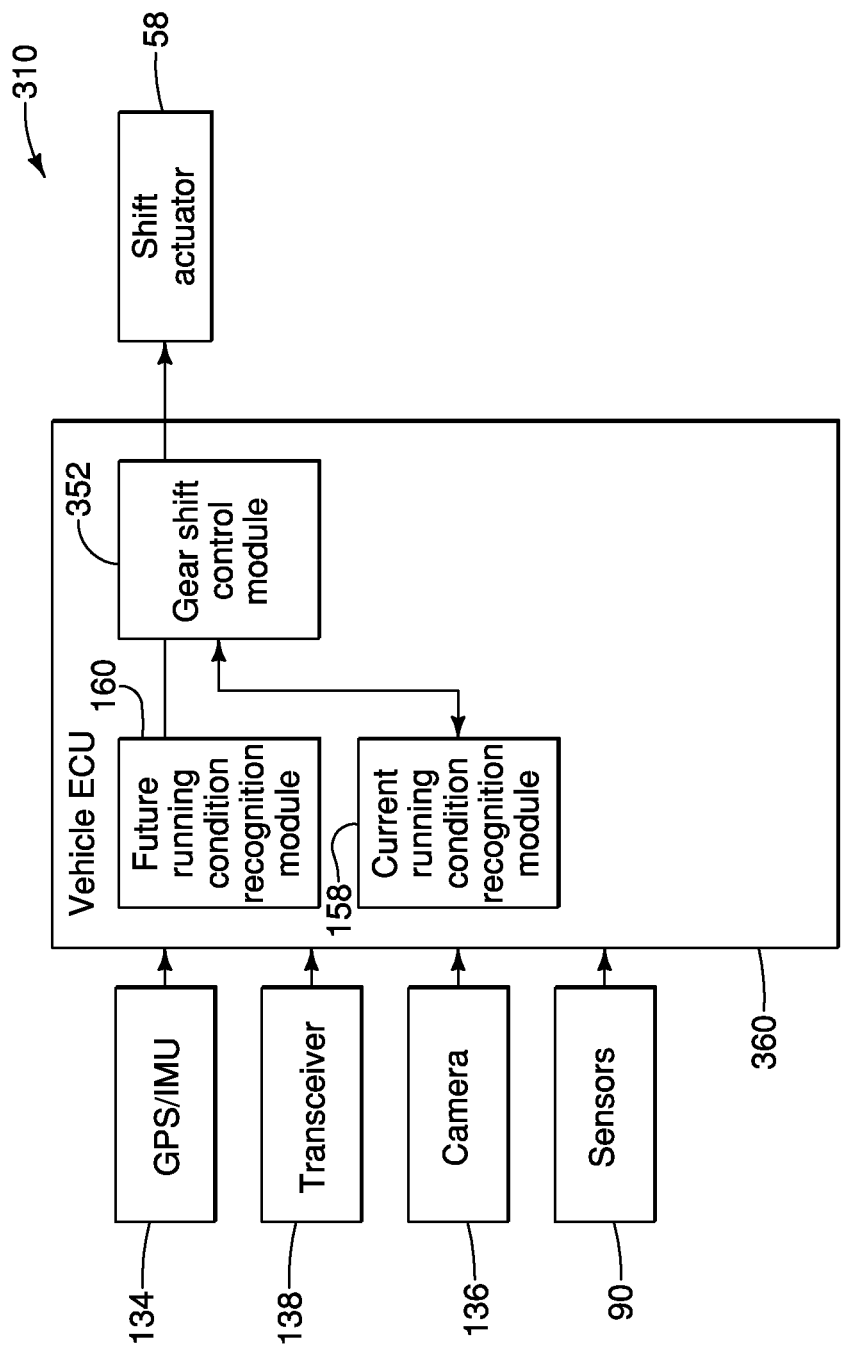
FIG. 16 illustrates a block diagram of an electronic configuration of a vehicle in accordance with another modification example.

In the illustrated embodiment, the vehicles 10 and 210 form an autonomous vehicle. On the other hand, the gear shift control of the present application can be applied to a vehicle 310 manually driven by a human driver for performing an automatic gear shift operation and/or for assisting a human driver's shift operation. As illustrated in FIG. 16, the vehicle 310 is similar to the vehicle 10, except that the vehicle 310 does not have the actuators of the external vehicle actuator 100 that physically operate the physically operable parts of the wheeled vehicle body 11. In view of the similarity between the vehicle 10 and the vehicle 310, the parts of the vehicle 310 that are identical to the parts of the vehicle 10 will be given the same reference numerals as the parts of the vehicle 10. Moreover, the descriptions of the parts of the vehicle 310 that are identical to the parts of the vehicle 10 may be omitted for the sake of brevity.

As illustrated in FIG. 16, the vehicle 310 has a vehicle ECU 360 that is similar to the vehicle ECU 60 of the wheeled vehicle body 11. Also, the vehicle ECU 360 functions similarly as the external ECU 132 of the external vehicle actuator 100, except that the vehicle ECU 360 mainly performs the gear shift control. Specifically, the vehicle ECU 360 includes a gear shift control module 352 that functions similarly as the main control module 150 of the external ECU 132, except that the gear shift control module 352 mainly performs the gear shift control and also functions similarly as the gear shift control module 152 of the external ECU 132.

With this configuration, the vehicle ECU 360 can perform the gear shift control in the same manner as the external ECU 132 of the wheeled vehicle body 11. In particular, the vehicle ECU 360 can output an operation signal to the shift actuator 58 to perform the gear shift control.

Thus, the vehicle 310 can provide proper gear shift timing and assist a human driver's shift operation. In the illustrated embodiment, the vehicle ECU 360 directly controls the shift actuator 58 for the shift operation. However, the vehicle ECU 360 can also be configured to merely notify a human driver of the gear shift timing without directly controlling the shift actuator 58 and without performing the shift operation. In this case, the vehicle ECU 360 can notify a human driver of a recommended gear shift timing in real-time, in advance or after the fact.

Although not illustrated in FIG. 16, the vehicle 310 can also include the data storage 140 (FIGS. 4 and 15) that stores the predetermined target speed profile in association with vehicle location data. In this case, the predetermined target speed profile can be determined while traveling based on history data indicative of a vehicle running condition (e.g., vehicle speed, acceleration/deceleration, and the like) when the same or other driver traveled at the location in the past. Furthermore, in this case, the driver can input a command to selectively switch the different speed profiles of the predetermined target speed profile during traveling. The command can indicate an aggressiveness for the traveling of the vehicle 310 to switch the different speed profiles that correspond to different aggressiveness, respectively.

In the illustrated embodiment, the vehicle 10 includes the main body 12, the transmission mechanism 40 (e.g., the transmission) having the plurality of gear stages, the data storage 140, and the external ECU 132 (e.g., the electronic controller). The data storage stores the vehicle running condition data that includes at least one of the prescribed vehicle running condition, the sensed vehicle running condition and the transmitted vehicle running condition. The external ECU 132 is configured to determine the gear shift of the gear stages of the transmission mechanism 40 based on the future vehicle speed that has been estimated based on the vehicle running condition data.

In the illustrated embodiment, the external ECU 132 is further configured to determine the gear shift of the gear stages of the transmission mechanism 40 based on the current vehicle speed and the future vehicle speed. Furthermore, the external ECU 132 is configured to shift the gear stages of the transmission mechanism 40 based on the current vehicle speed and the future vehicle speed that has been estimated based on the vehicle running condition data.

In the illustrated embodiment, the external ECU 132 is further configured not to perform the gear upshift (step S30) upon determining that the vehicle 10 is accelerating (Yes in step S12) and that the current vehicle speed is below the first prescribed threshold for the current gear stage (No in step S16). The external ECU 132 is further configured not to perform the gear upshift (step S30) upon determining that the vehicle 10 is accelerating (Yes in step S12) and that the future vehicle speed is below the second prescribed threshold for the current gear stage (No in step S18).

In the illustrated embodiment, the external ECU 132 is further configured to perform the gear upshift (step S20) upon determining that the current vehicle speed is above the first prescribed threshold for the current gear stage (Yes in step S16), and that the future vehicle speed is above the second prescribed threshold for the current gear stage (Yes in step S18).

In the illustrated embodiment, the first prescribed threshold for the current gear stage is smaller than the second prescribed threshold for the current gear stage.

In the illustrated embodiment, the external ECU 132 is further configured not to perform the gear downshift (step S30) upon determining that the vehicle 10 is deaccelerating (No in step S12) and that the current vehicle speed is above the third prescribed threshold for the current gear stage (No in step S24). The external ECU 132 is further configured not to perform the gear downshift (step S30) upon determining that the vehicle 10 is deaccelerating (No in step S12) and that the future vehicle speed is above the fourth prescribed threshold for the current gear stage (No in step S26).

In the illustrated embodiment, external ECU 132 is further configured to perform the gear downshift (step S28) upon determining that the current vehicle speed is below the third prescribed threshold for the current gear stage (Yes in step S24), and that the future vehicle speed is below the fourth prescribed threshold for the current gear stage (Yes in step S28).

In the illustrated embodiment, the third prescribed threshold for the current gear stage is larger than the fourth prescribed threshold for the current gear stage.

In the illustrated embodiment, the future vehicle speed is estimated using the target vehicle speed at the max/min point Mp (e.g., maximum and minimum vehicle speeds) along the predetermined target path (e.g., the predicted route) based on the vehicle running condition data.

In the illustrated embodiment, the future vehicle speed (e.g., the maximum and minimum vehicle speeds) are the target vehicle speed at the max/min point Mp (e.g., the maximum and minimum vehicle speeds) within the data processing range Rp (e.g., the predetermined range of the predicted route).

In the illustrated embodiment, the data processing range Rp has a predetermined time period (e.g., 5 seconds).

In the illustrated embodiment, the external ECU 132 is further configured to determine whether to shift the gear stages of the transmission mechanism 40 further based on at least one of the road slope (e.g., the slope of the road), the road camber (e.g., the camber of the road), the road bank (e.g., the bank of the road) and the road surface condition.

In the illustrated embodiment, the vehicle 10 further includes the external vehicle actuator 100 including the external ECU 132. The external vehicle actuator 100 is configured to operate the transmission mechanism 40, and steer the vehicle 10.

In the illustrated embodiment, the vehicle 10 further includes the handlebar 30, and the single steerable front wheel 16 mounted to the main body 12 via the front fork 32.

In the illustrated embodiment, the external ECU 132 is further configured to downshift the gear stages of the transmission mechanism 40 to maintain the future vehicle speed upon determining a change in the slope of the road based on the vehicle running condition data.

In the illustrated embodiment, the vehicle 210 includes the internal vehicle actuator 212 configured to operate the transmission mechanism 40, and steer the vehicle 210.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a vehicle on a horizontal surface.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a main body;
   a transmission having a plurality of gear stages;
   a data storage storing vehicle running condition data that includes at least one of a prescribed vehicle running condition, a sensed vehicle running condition, or a transmitted vehicle running condition; and
   an electronic controller configured to determine a gear shift of the gear stages of the transmission based on a current vehicle speed and a future vehicle speed that has been estimated based on the vehicle running condition data, wherein
   the electronic controller is further configured not to perform a gear upshift upon determining that the vehicle is accelerating and that the current vehicle speed is below a first prescribed threshold for a current gear stage, and
   the electronic controller is further configured not to perform the gear upshift upon determining that the vehicle is accelerating and that the future vehicle speed is below a second prescribed threshold for the current gear stage.

2. The vehicle according to claim 1, wherein
   the electronic controller is further configured to perform the gear upshift upon determining that the current vehicle speed is above the first prescribed threshold for the current gear stage, and that the future vehicle speed is above the second prescribed threshold for the current gear stage.

3. The vehicle according to claim 1, wherein
   the first prescribed threshold for the current gear stage is smaller than the second prescribed threshold for the current gear stage.

4. The vehicle according to claim 1, wherein
   the future vehicle speed is estimated using maximum and minimum vehicle speeds along a predicted route based on the vehicle running condition data.

5. The vehicle according to claim 4, wherein
   the maximum and minimum vehicle speeds are maximum and minimum vehicle speeds within a predetermined range of the predicted route.

6. The vehicle according to claim 5, wherein
   the predetermined range of the predicted route has a predetermined time period.

7. The vehicle according to claim 1, wherein
   the electronic controller is further configured to determine the gear shift of the gear stages of the transmission further based on at least one of a slope of a road, a camber of the road, a bank of the road, or a road surface condition.

8. The vehicle according to claim 7, wherein
   the electronic controller is further configured to perform a gear downshift to maintain the future vehicle speed upon determining a change in the slope of the road based on the vehicle running condition data.

9. The vehicle according to claim 1, further comprising
   an external vehicle actuator including the electronic controller, the external vehicle actuator being configured to operate the transmission and steer the vehicle.

10. The vehicle according to claim 1, further comprising
    an internal vehicle actuator configured to operate the transmission and steer the vehicle.

11. The vehicle according to claim 1, further comprising
    a handlebar, and
    a single steerable front wheel mounted to the main body via a front fork.

12. A vehicle comprising:
    a main body;
    a transmission having a plurality of gear stages;
    a data storage storing vehicle running condition data that includes at least one of a prescribed vehicle running condition, a sensed vehicle running condition, or a transmitted vehicle running condition; and
    an electronic controller configured to determine a gear shift of the gear stages of the transmission based on a current vehicle speed and a future vehicle speed that has been estimated based on the vehicle running condition data, wherein
    the electronic controller is further configured not to perform a gear downshift upon determining that the vehicle is deaccelerating and that the current vehicle speed is above a third prescribed threshold for a current gear stage, and
    the electronic controller is further configured not to perform the gear downshift upon determining that the vehicle is deaccelerating and that the future vehicle speed is above a fourth prescribed threshold for the current gear stage.

13. The vehicle according to claim 12, wherein
    the electronic controller is further configured to perform the gear downshift upon determining that the current vehicle speed is below the third prescribed threshold for the current gear stage, and that the future vehicle speed is below the fourth prescribed threshold for the current gear stage.

14. The vehicle according to claim 12, wherein
the third prescribed threshold for the current gear stage is larger than the fourth prescribed threshold for the current gear stage.
15. The vehicle according to claim 12, wherein
the future vehicle speed is estimated using maximum and minimum vehicle speeds along a predicted route based on the vehicle running condition data.
16. The vehicle according to claim 15, wherein
the maximum and minimum vehicle speeds are maximum and minimum vehicle speeds within a predetermined range of the predicted route.
17. The vehicle according to claim 16, wherein
the predetermined range of the predicted route has a predetermined time period.
18. The vehicle according to claim 12, wherein
the electronic controller is further configured to determine the gear shift of the gear stages of the transmission further based on at least one of a slope of a road, a camber of the road, a bank of the road, or a road surface condition.
19. The vehicle according to claim 18, wherein
the electronic controller is further configured to perform a gear downshift to maintain the future vehicle speed upon determining a change in the slope of the road based on the vehicle running condition data.
20. The vehicle according to claim 12, further comprising
a handlebar, and
a single steerable front wheel mounted to the main body via a front fork.

* * * * *